(12) United States Patent
Nihei et al.

(10) Patent No.: US 12,293,033 B2
(45) Date of Patent: May 6, 2025

(54) DISPLAY ANTENNA

(71) Applicant: NEC Corporation, Tokyo (JP)

(72) Inventors: Ryota Nihei, Tokyo (JP); Junichi Funada, Tokyo (JP); Kenji Wakafuji, Tokyo (JP); Kazuyuki Hayashi, Tokyo (JP); Kohei Yoshida, Tokyo (JP); Shingo Watanabe, Tokyo (JP); Kazushi Sugyo, Tokyo (JP); Masakazu Ono, Tokyo (JP); Fujio Okumura, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/517,546

(22) Filed: Nov. 22, 2023

(65) Prior Publication Data

US 2024/0176439 A1 May 30, 2024

(30) Foreign Application Priority Data

Nov. 30, 2022 (JP) .................. 2022-191416

(51) Int. Cl.
*G06F 3/041* (2006.01)
*G06F 3/042* (2006.01)
*G06F 3/044* (2006.01)
*G06F 3/04842* (2022.01)
*H01Q 1/22* (2006.01)
*H01Q 3/36* (2006.01)

(52) U.S. Cl.
CPC .......... *G06F 3/0412* (2013.01); *G06F 3/0421* (2013.01); *G06F 3/0446* (2019.05); *G06F 3/04842* (2013.01); *H01Q 1/22* (2013.01); *H01Q 3/36* (2013.01)

(58) Field of Classification Search
CPC ...... G06F 3/041; G06F 3/0412; G06F 3/0446; G06F 3/0421; G06F 3/04842; H01Q 1/22; H01Q 3/36
See application file for complete search history.

(56) References Cited

U.S. PATENT DOCUMENTS

| | | | |
|---|---|---|---|
| 2019/0165486 A1* | 5/2019 | Yoshida | H04B 7/0617 |
| 2023/0208026 A1* | 6/2023 | Wiegner | H01Q 3/24 342/374 |

FOREIGN PATENT DOCUMENTS

JP  2021-060968 A  4/2021

* cited by examiner

*Primary Examiner* — Sardis F Azongha
(74) *Attorney, Agent, or Firm* — Sughrue Mion, PLLC

(57) ABSTRACT

Provided is a display antenna including a display including a plurality of light emitters arranged in a grid, an antenna array having an antenna assembly in which a plurality of patch antennas through which light in a wavelength band of a visible region is transmitted is disposed in a grid, the antenna array being disposed to be superimposed on the display, and a phase shifter disposed in a gap region sandwiched between the plurality of light emitters, connected to at least one of the plurality of patch antennas, and configured to shift a signal to be transmitted and received.

10 Claims, 26 Drawing Sheets

DISPLAY ANTENNA

This application is based upon and claims the benefit of priority from Japanese Patent Application No. 2022-191416, filed on Nov. 30, 2022, the disclosure of which is incorporated herein in its entirety by reference.

TECHNICAL FIELD

The present disclosure relates to a display antenna having functions of a display and an antenna.

BACKGROUND ART

For mobile communication after the fifth generation mobile communication system (5G), planar antennas compatible with radio waves in a higher frequency band than that before the fourth generation mobile communication system (4G) have been developed. A planar phased array antenna can be configured by using an antenna array having a configuration in which patch antennas are arranged in an array. An antenna array including a plurality of patch antennas can also function as a touch panel.

PTL 1 (JP 2021-060968 A) discloses a display device including a touch electrode for a touch input function and an antenna electrode for a communication function. The device of PTL 1 includes a display panel that displays video and a touch antenna array disposed on the display panel. The touch antenna array includes a touch electrode, a touch line electrically coupled with the touch electrode, an antenna electrode, a power feeding line electrically coupled with the antenna electrode, and a shielding electrode disposed between the touch line and the power feeding line.

The antenna electrode pattern of PTL 1 is in the form of a lattice or a mesh. PTL 1 does not describe a phase shifter. The phase shifters are used for beamforming radio waves transmitted from a plurality of antenna electrodes. Therefore, in the method of PTL 1, a radio wave having directivity cannot be transmitted from a plurality of antenna electrodes.

An object of the present disclosure is to provide a display antenna capable of transmitting and receiving directional radio waves.

SUMMARY

A display antenna according to one aspect of the present disclosure includes a display including a plurality of light emitters arranged in a grid, an antenna array having an antenna assembly in which a plurality of patch antennas through which light in a wavelength band of a visible region is transmitted is disposed in a grid, the antenna array being disposed to be superimposed on the display, and a phase shifter disposed in a gap region sandwiched between the plurality of light emitters, connected to at least one of the plurality of patch antennas, and configured to shift a signal to be transmitted and received.

BRIEF DESCRIPTION OF THE DRAWINGS

Exemplary features and advantages of the present invention will become apparent from the following detailed description when taken with the accompanying drawings in which.

EXAMPLE EMBODIMENT

Figure 1:
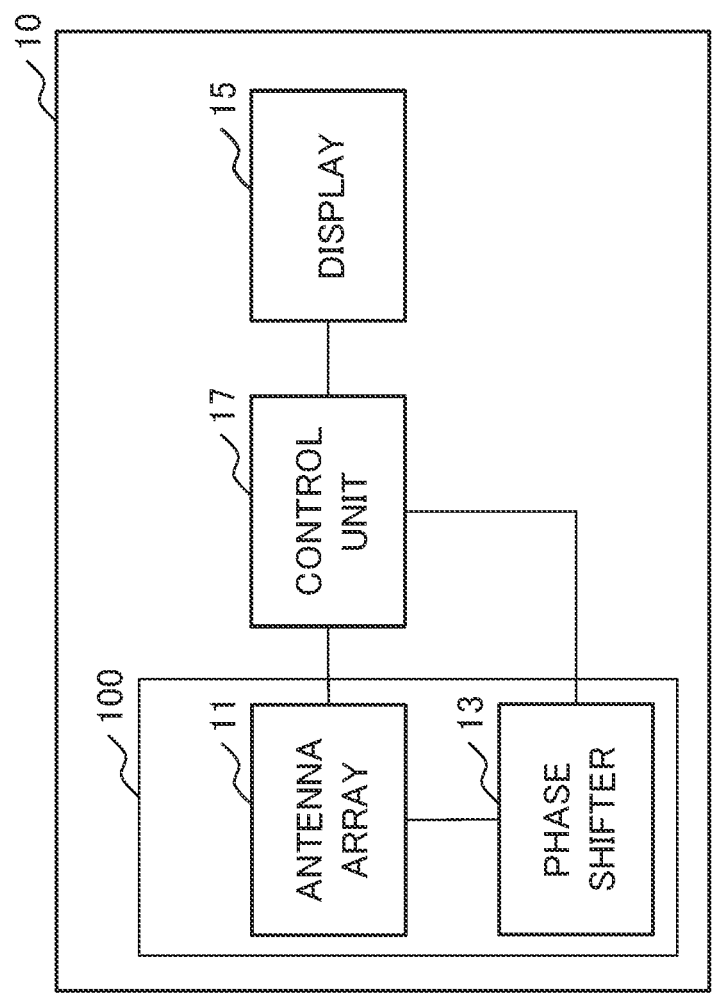
FIG. 1 is a block diagram illustrating an example of a configuration of a display antenna according to the present disclosure.

Example embodiments of the present invention will be described below with reference to the drawings. In the following example embodiments, technically preferable limitations are imposed to carry out the present invention, but the scope of this invention is not limited to the following description. In all drawings used to describe the following example embodiments, the same reference numerals denote similar parts unless otherwise specified. In addition, in the following example embodiments, a repetitive description of similar configurations or arrangements and operations may be omitted.

First Example Embodiment

First, a display antenna according to a first example embodiment will be described with reference to the drawings. The display antenna of the present example embodiment has functions of a touch sensor and an antenna. In the present example embodiment, an example in which an antenna assembly is configured by a plurality of patch antennas will be described. The antenna assembly can function as a phased array antenna and a touch sensor. The antenna assembly only needs to exhibit the function of the phased array antenna, and does not need to function as a touch sensor.

(Configuration)

FIG. 1 is a block diagram illustrating an example of a configuration of a display antenna 10 according to the present disclosure. The display antenna 10 includes an antenna array 11, a phase shifter 13, a display 15, and a control unit 17. The antenna array 11 and the phase shifter 13 constitute an antenna device 100. The control unit 17 may be added to the antenna device 100. The display antenna 10 has a structure in which the antenna device 100 is superimposed on the display 15. The control unit 17 may be disposed outside the display antenna 10. In this case, the display antenna 10 includes an antenna array 11, a phase shifter 13, and a display 15.

The antenna array 11 includes a plurality of patch antennas. The patch antenna is a plate-shaped radiation element. For example, the patch antenna is a square. The patch antenna may be rectangular or rhombic. As long as a radio wave in a wavelength band to be transmitted and received can be received, the patch antenna may have a shape other than a square or a rectangle. The patch antenna is a transparent electrode capable of transmitting light in a wavelength band of a visible region. For example, the visible region is a wavelength band of 380 to 800 nm (nanometer). For example, the patch antenna is made of a material such as indium tin oxide, zinc oxide, tin oxide, or titanium oxide. The material of the patch antenna is not limited as long as light in the wavelength band of the visible region can be transmitted. The patch antenna may be made of a material that transmits light in a wavelength band that is not in the visible region. For example, the patch antenna may be made of a material that transmits light in a near-infrared region, an infrared region, or an ultraviolet region.

Figure 2:
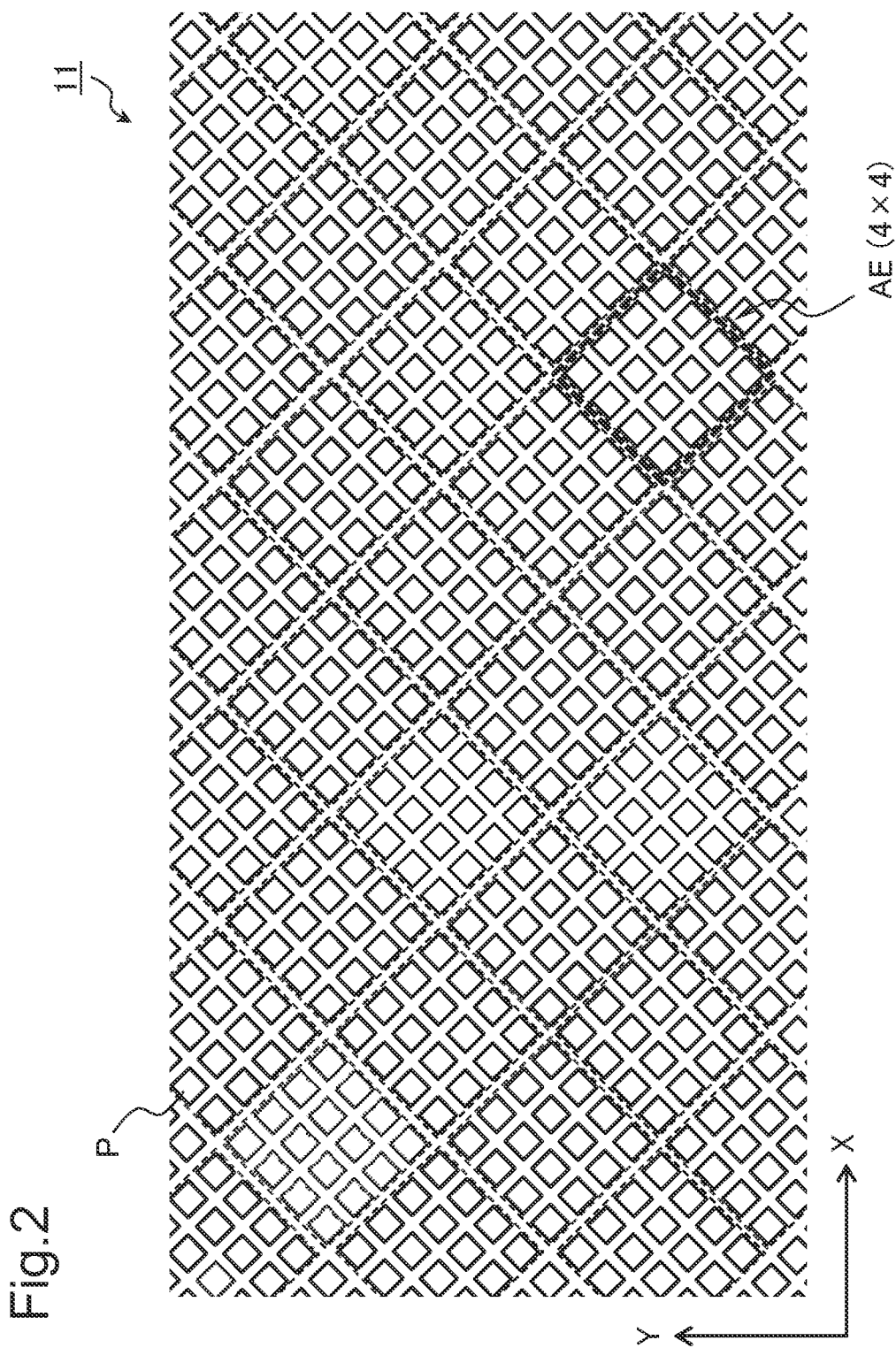
FIG. 2 is a conceptual diagram illustrating an example of an antenna assembly configured by an antenna array included in the display antenna according to the present disclosure.

FIG. 2 is a conceptual diagram illustrating an example of a configuration of the antenna array 11. The antenna array 11 has a configuration in which a plurality of patch antennas P are arranged in a two-dimensional array: The patch antenna P resonates at a frequency that matches an integral multiple of a ½ wavelength of a length relevant to one side. The size of the patch antenna P is set according to the wavelength of the radio wave to be transmitted and received. In the example of FIG. 2, the patch antenna P is a square. The plurality of patch antennas P form a pattern (diamond shaped pattern) in which the patch antennas P are arranged in a state of being rotated by 45 degrees about an intersection of diagonal lines of a square forming an outer shape of the patch antennas P as a rotation center. That is, the plurality of patch antennas P are arranged in a diamond shaped pattern. As long as the functions of the touch sensor and the phased array antenna can be revealed, the plurality of patch antennas P may be arranged in a pattern other than the diamond shaped pattern.

The plurality of patch antennas P are arranged in a two-dimensional array along the X direction and the Y direction. The plurality of patch antennas P are grouped in units of several patch antennas P. In the example of FIG. 2, an antenna assembly AE arranged in 4×4 is configured with 16 patch antennas P as a unit. As will be described later, in the display antenna 10 of the present example embodiment, the number and combination of the patch antennas P forming the antenna assembly AE can be changed.

The optimum size of the patch antenna P used in the frequency band relevant to the mobile communication after the fifth generation mobile communication system (5G) is different from the optimum size of the sensor electrode used in the touch panel. With respect to the wavelength λ in the space of the radio wave to be transmitted and received, if the interval (pitch) between the adjacent patch antennas P is made larger than 0.7%, the side lobe increases and the gain decreases. The wider the pitch of the adjacent patch antennas P, the narrower the scanning angle. Therefore, the pitch of the adjacent patch antennas P is preferably set to about 0.4 to 0.5%. The optimum size of the patch antenna P and the optimum pitch of the electrodes of the touch panel are different depending on the frequency band relevant to mobile communication after 5G. In the present example embodiment, the number and combination of the patch antennas P forming the antenna assembly AE are changed according to the wavelength of the radio wave to be transmitted and received, thereby supporting a plurality of wavelength bands.

Figure 3:
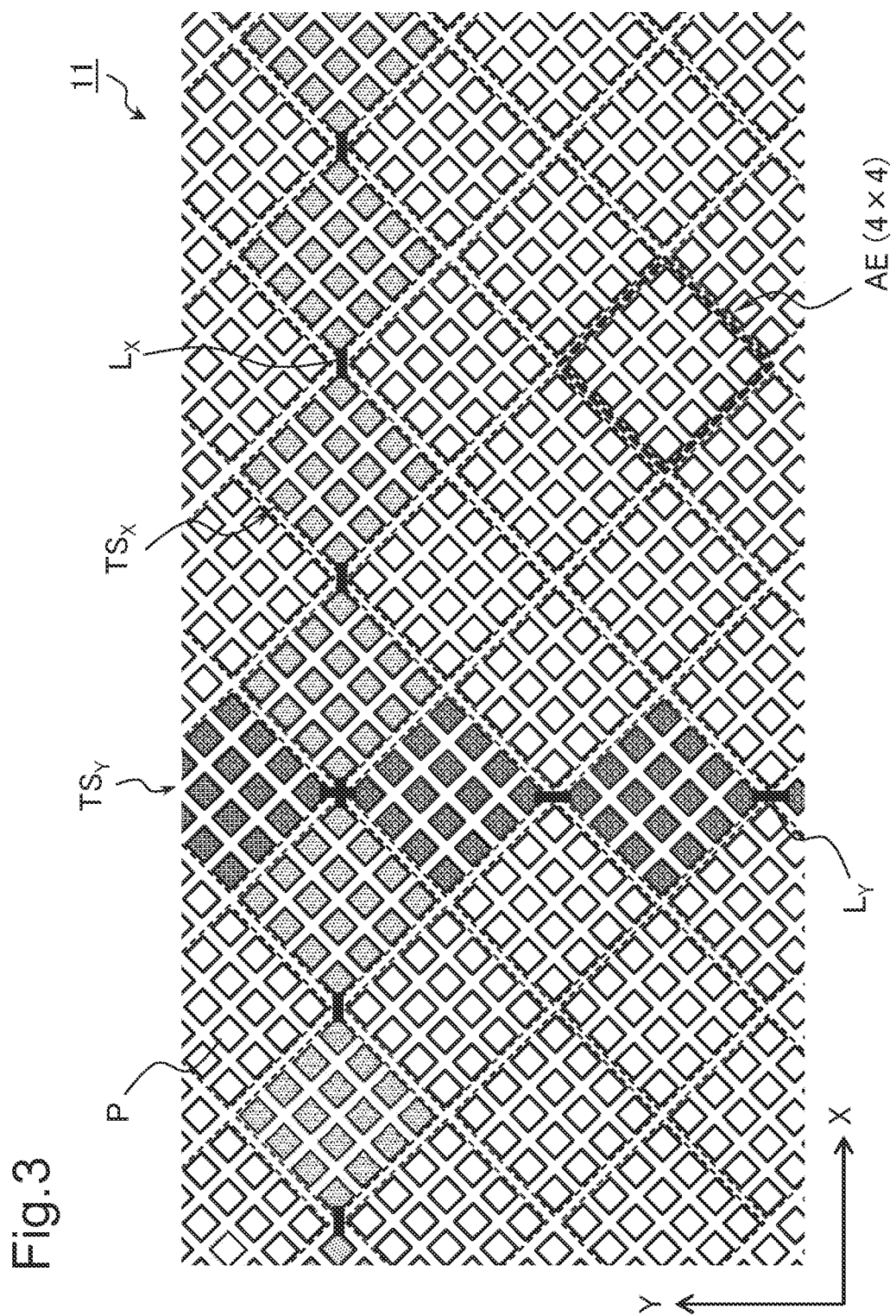
FIG. 3 is a conceptual diagram illustrating an example of a touch sensor configured by an antenna array included in a display antenna according to the present disclosure.

FIG. 3 is a conceptual diagram illustrating an example of a state in which a touch sensor is set in the antenna array 11. In the example of FIG. 3, the antenna assembly AE including 4×4 (16) patch antennas P as one set is configured. In the example of FIG. 3, a part of the 4×4 (16) patch antennas P functions as an electrode of the touch sensor. The patch antennas P functioning as electrodes is divided into an antenna assembly AE forming a touch sensor $TS_X$ arranged in the X direction and an antenna assembly AE forming a touch sensor $TS_Y$ arranged in the Y direction. The patch antenna P used as the touch sensor can be selected under the control of the control unit 17. The patch antenna P that is not used as the touch sensor functions as a phased array antenna. The contact position is determined according to a change in capacitance at an intersection of a row constituted by the plurality of antenna assemblies AE coupled in the X direction and a column constituted by the plurality of antenna assemblies AE coupled in the Y direction.

Figure 4:
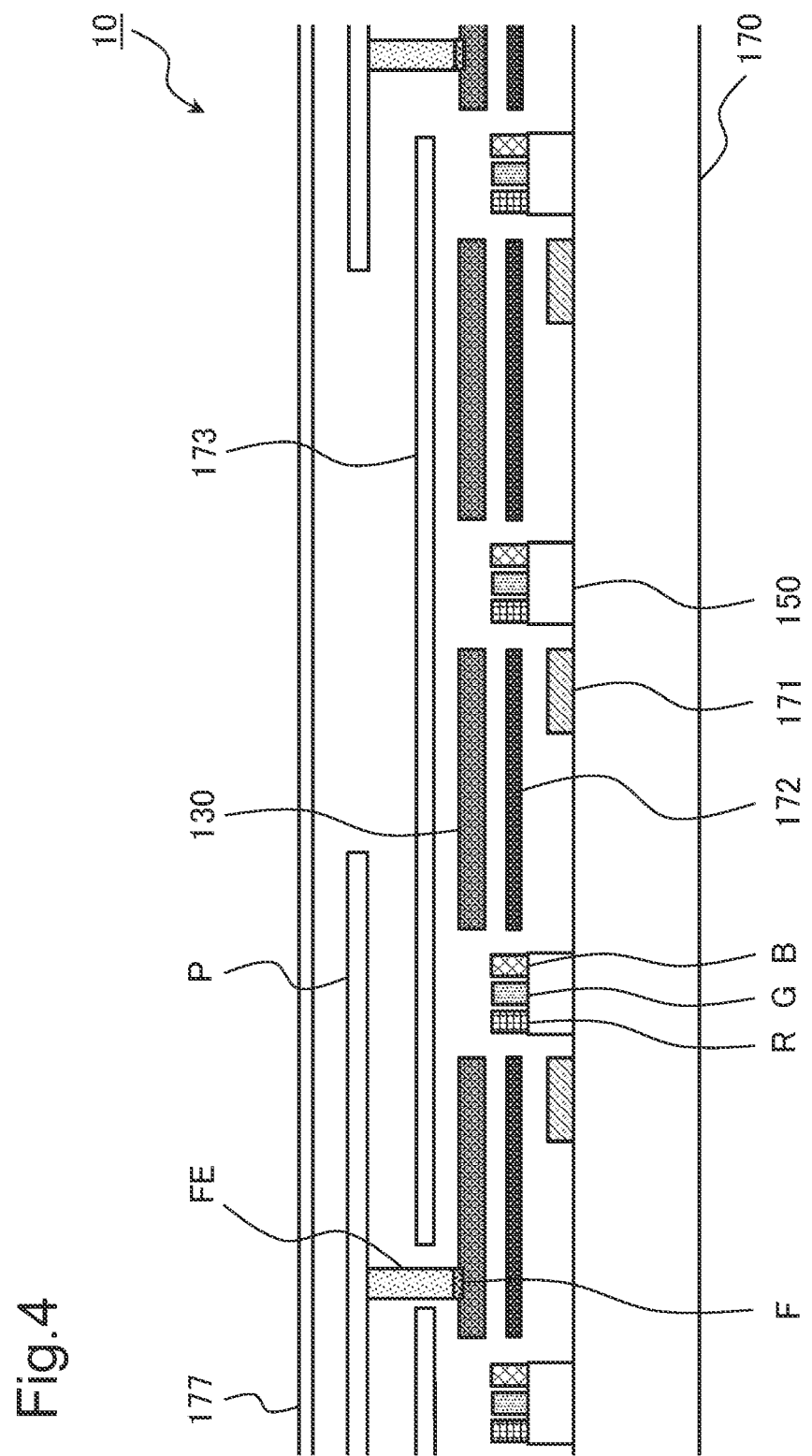
FIG. 4 is a cross-sectional view illustrating an example of an internal configuration of a display antenna according to the present disclosure.

FIG. 4 is a cross-sectional view for explaining an example of a structure of the display antenna 10. In FIG. 4, a part of the configuration of the display antenna 10 is omitted. In the cross-sectional view of FIG. 4, there are some places from which hatching is omitted.

The display 15 is formed on a substrate 170. The display 15 includes a plurality of light emitters 150. The plurality of light emitters 150 are disposed in a two-dimensional array. For example, the light emitter 150 has a light emitting unit that emits light in a wavelength band relevant to each color of red (R), green (G), and blue (B). For example, the light emitter 150 is achieved by a micro LED (Light-Emitting Diode). The micro LED includes a red LED that emits light in a red R wavelength band, a green LED that emits light in a green G wavelength band, and a blue LED that emits light in a blue B wavelength band. If light of three primary colors of red R, green G, and blue B can be emitted, various colors can be expressed by mixing these lights. The light emitter 150 may include at least one of a red LED, a green LED, and a blue LED. The light emitter 150 may include a light emitting unit that emits light in a wavelength band different from those of the red LED, the green LED, and the blue LED. The light emitter 150 is connected to a drive unit (not illustrated) via wiring included in a wiring layer 171. The light emitter 150 causes the red LED, the green LED, and the blue LED to emit light in accordance with the control of the drive unit by the control unit 17.

Figure 5:
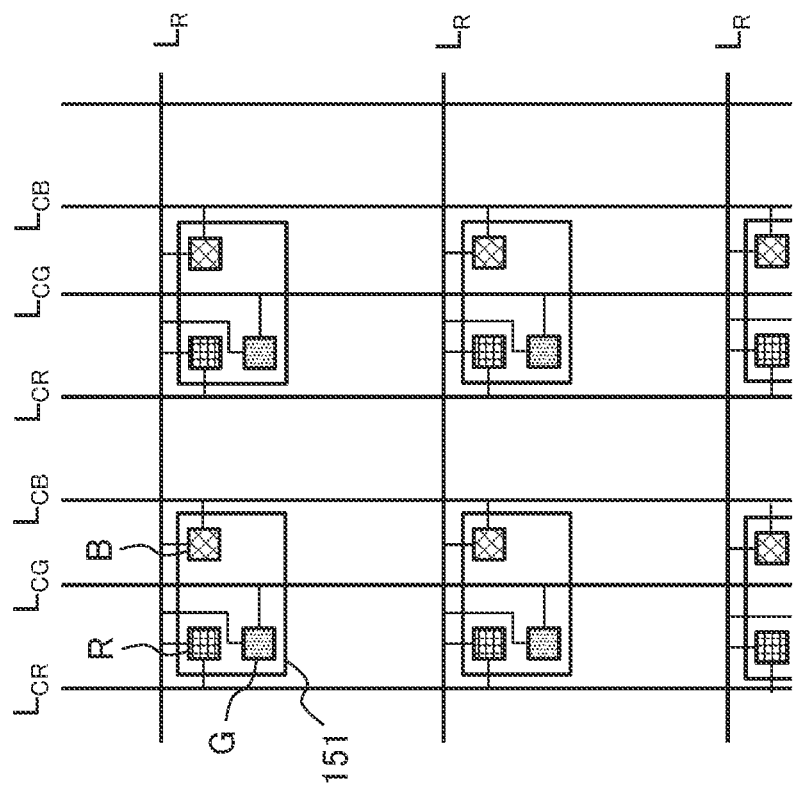
FIG. 5 is a conceptual diagram illustrating an example of a configuration of a display included in a display antenna according to the present disclosure.

FIG. 5 is a conceptual diagram illustrating a state in which an example (light emitter 151) of the light emitters 150 forming the display 15 is arranged. FIG. 5 illustrates a part of the display 15 formed of a plurality of light emitters 151. In the light emitter 151, the red LED (R), the green LED (G), and the blue LED (B) are micro LEDs. The red LED, the green LED, and the blue LED are disposed in a concentrated manner in one place. A row selection line $L_R$ and a column selection line $L_{CR}$ are connected to the red LED. The row selection line $L_R$ and a column selection line $L_{CG}$ are connected to the green LED. The row selection line $L_R$ and a column selection line $L_{CB}$ are connected to the blue LED. The row selection line $L_R$ is a selection line common to the red LED, the green LED, and the blue LED. When the row selection line $L_R$ and the column selection line $L_{CR}$ are selected, the red LED emits light. When the row selection line $L_R$ and the column selection line $L_{CG}$ are selected, the green LED emits light. When the row selection line $L_R$ and the column selection line $L_{CB}$ are selected, the blue LED emits light.

Figure 6:
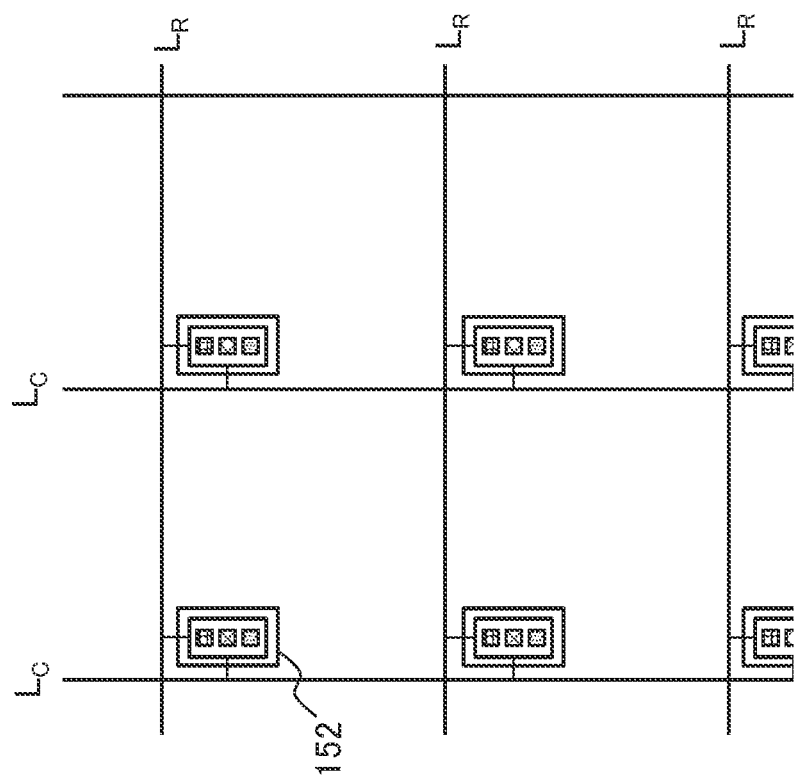
FIG. 6 is a conceptual diagram illustrating an example of a configuration of a display included in a display antenna according to the present disclosure.

FIG. 6 is a conceptual diagram illustrating a state in which another example (light emitters 152) of the light emitters 150 forming the display 15 is arranged. FIG. 6 illustrates a part of the display 15 formed of a plurality of light emitters 152. The light emitter 152 is an integrated micro LED in which red, green, and blue light emitting units are integrated. The red LED, the green LED, and the blue LED are connected to a common row selection line $L_R$ and a common column selection line $L_C$. The outer shape of the light emitter 152 in FIG. 6 is smaller than that of the light emitter 151 in FIG. 5. Therefore, the interval between the light emitters 152 is larger in the configuration of FIG. 6 than in the configuration of FIG. 5.

The plurality of light emitters 150 forming the display 15 emit light under the control of the control unit 17. The plurality of light emitters 150 are disposed in a two-dimensional array. For example, an insulating layer is formed between the plurality of light emitters 150 and the wiring layer 171. The material of the insulating layer is not particularly limited. For example, a gap may be formed between the plurality of light emitters 150 and the wiring layer 171.

An image is displayed on the display 15. For example, an image of a touch panel including at least one input image is displayed on the display 15. For example, the input image is a button for accepting an operation. For example, the input image is an image of a key that accepts input of characters, numbers, and symbols such as a keyboard and a numeric keypad. For example, the input image is an image that receives an operation, such as a slider or a tag. When contact is detected by the patch antenna P functioning as the touch sensor at the position of the input image displayed on the display 15, an input relevant to the operation detected at the position of the input image is made.

The wiring layer 171 is formed in a region between the light emitters 150. The wiring layer 171 is formed between the plurality of light emitters 150. In the wiring layer 171, wiring for driving the display 15 is disposed. In the wiring layer 171, a first switch, various wirings, and the like may be disposed. A signal line that propagates a signal to be transmitted and received may be disposed in the wiring layer 171. The wiring layer 171 may be a single layer or may have a structure in which a plurality of layers are laminated. For example, a minute element can be formed in the wiring layer 171 by using a device transfer technique. The drawings are omitted for details such as components in the wiring layer 171 and a connection relationship between the components.

A flattening film or a protective film is formed on the display 15 including the plurality of light emitters 150. The flattening film and the protective film are transparent materials through which light in a wavelength band of a visible region can pass. The materials of the flattening film and the protective film are not limited as long as light in the wavelength band of the visible region can be transmitted. For example, the flattening film and the protective film are achieved by silicon oxide or the like. A gap may be formed in the upper portion of the display 15.

A shield electrode 172 is disposed above the region where the wiring layer 171 is formed. The shield electrode 172 is disposed so as to avoid a region above the light emitter 150. The shield electrode 172 is formed to prevent electromagnetic coupling above and below the shield electrode 172. The material of the shield electrode 172 is not particularly limited as long as it has conductivity. For example, the shield electrode 172 is achieved by a material containing metal such as aluminum or copper. The shield electrode 172 is connected to the housing or the ground terminal by a conductive wire (not illustrated) or the like. The potential of the shield electrode 172 is the same potential as the ground point to which the shield electrode 172 is connected. Therefore, a capacitance relevant to the dielectric constant of the dielectric layer or space formed between the patch antenna P, the wiring layer 171, a phase shifter forming layer 130, and the shield electrode 172 is formed.

The phase shifter forming layer 130 is disposed above the shield electrode 172. The phase shifter 13 is formed in the phase shifter forming layer 130. The phase shifter 13 is disposed at a position so as to avoid a region above the light emitter 150. A power feeding point F of the phase shifter 13 is connected to the patch antenna P via a power feeding electrode FE. In the phase shifter forming layer 130, a first switch, various wirings, and the like may be disposed. In the phase shifter forming layer 130, a signal line $L_S$ for propagating a signal to be transmitted and received may be disposed. The phase shifter forming layer 130 may be a single layer or may have a structure in which a plurality of layers are laminated. For example, minute elements can be formed in the phase shifter forming layer 130 by using a device transfer technique. The drawings are omitted for details of the components in the phase shifter forming layer 130 and the connection relationship between the components.

Figure 7:
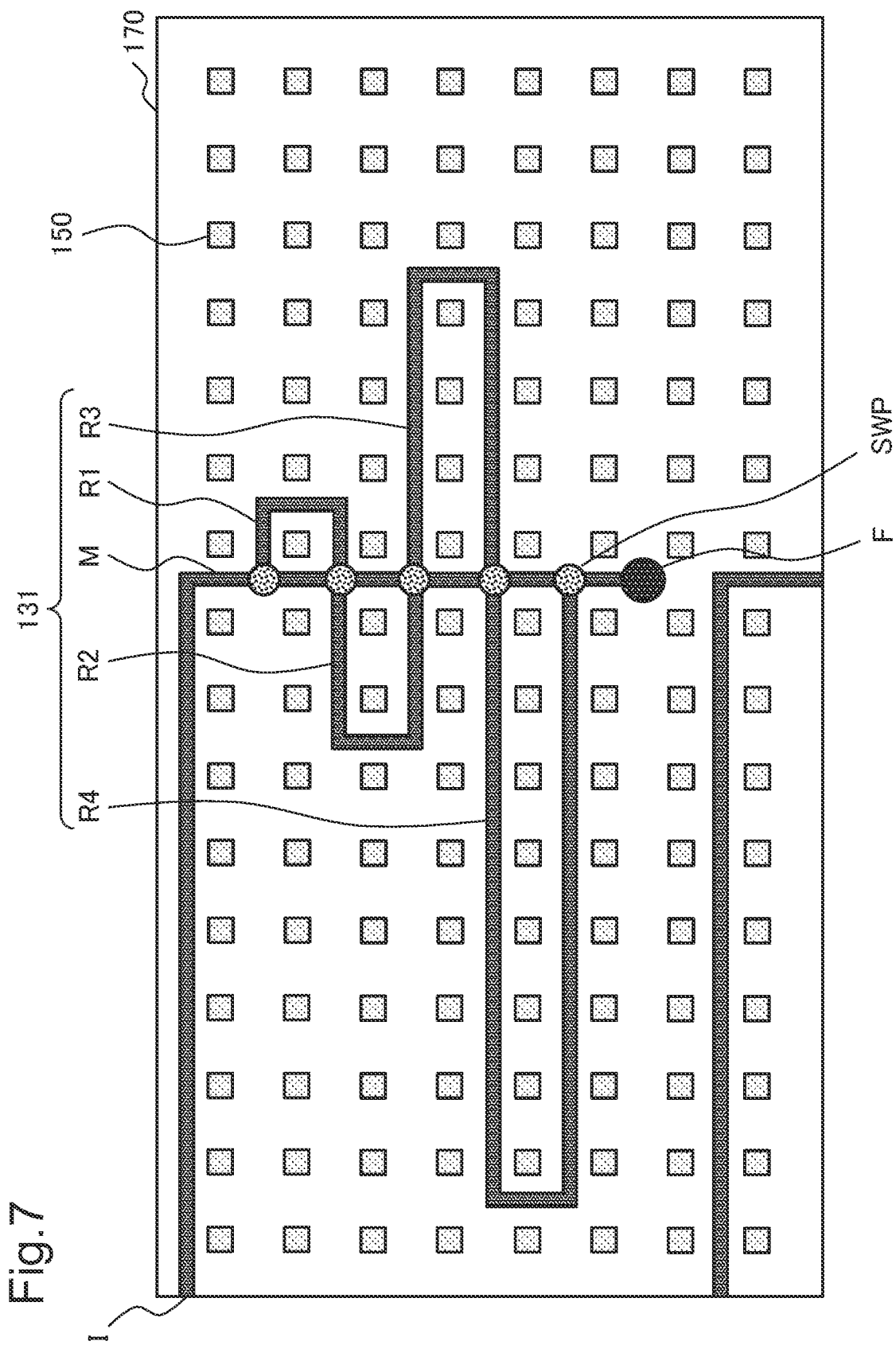
FIG. 7 is a conceptual diagram illustrating an example of a configuration of a phase shifter included in a display antenna according to the present disclosure.

FIG. 7 illustrates an example (phase shifter 131) of the phase shifter 13 disposed in the phase shifter forming layer 130. FIG. 7 is a plan view of the upper surface of the substrate 170 as viewed from an upper viewing seat. The phase shifter 131 is disposed between the plurality of light emitters 150 in top view: The phase shifter 131 is an example of a line switching phase shifter. The phase shifter 131 has a configuration in which branch lines (R1, R2, R3, R4) having different line lengths are connected to a main line M via a phase shift switch SWP. In the example of FIG. 7, four branch lines (R1, R2, R3, R4) are connected to the main line M connecting an input terminal I to the power feeding point F. The signal having passed through the phase shifter 131 is phase-shifted by a phase shift amount relevant to the connection state between the main line M and the branch line (R1, R2, R3, R4). The connection between the main line M and the branch line (R1, R2, R3, R4) is switched according to the opening/closing control of the phase shift switch SWP by the control unit 17.

The branch line R1 is a line that gives a phase difference of 22.5 degrees. The phase of the signal that has passed through the branch line R1 is shifted by 22.5 degrees with respect to the phase of the signal that has traveled through the main line M without passing through the branch line R1. The branch line R2 is a line that gives a phase difference of 45 degrees. The phase of the signal that has passed through the branch line R2 is shifted by 45 degrees with respect to the phase of the signal that has traveled through the main line M without passing through the branch line R2. The branch line R3 is a line that gives a phase difference of 90 degrees. The phase of the signal that has passed through the branch line R3 is shifted by 90 degrees with respect to the phase of the signal that has traveled through the main line M without passing through the branch line R3. The branch line R4 is a line that gives a phase difference of 180 degrees. The phase of the signal that has passed through the branch line R4 is shifted by 180 degrees with respect to the phase of the signal that has traveled through the main line M without passing through the branch line R4. For example, the phase of the signal that has passed through the branch line R1 and the branch line R2 is shifted by 47.5 degrees with respect to the phase of the signal that has passed through the main line M without passing through these lines.

Figure 8:
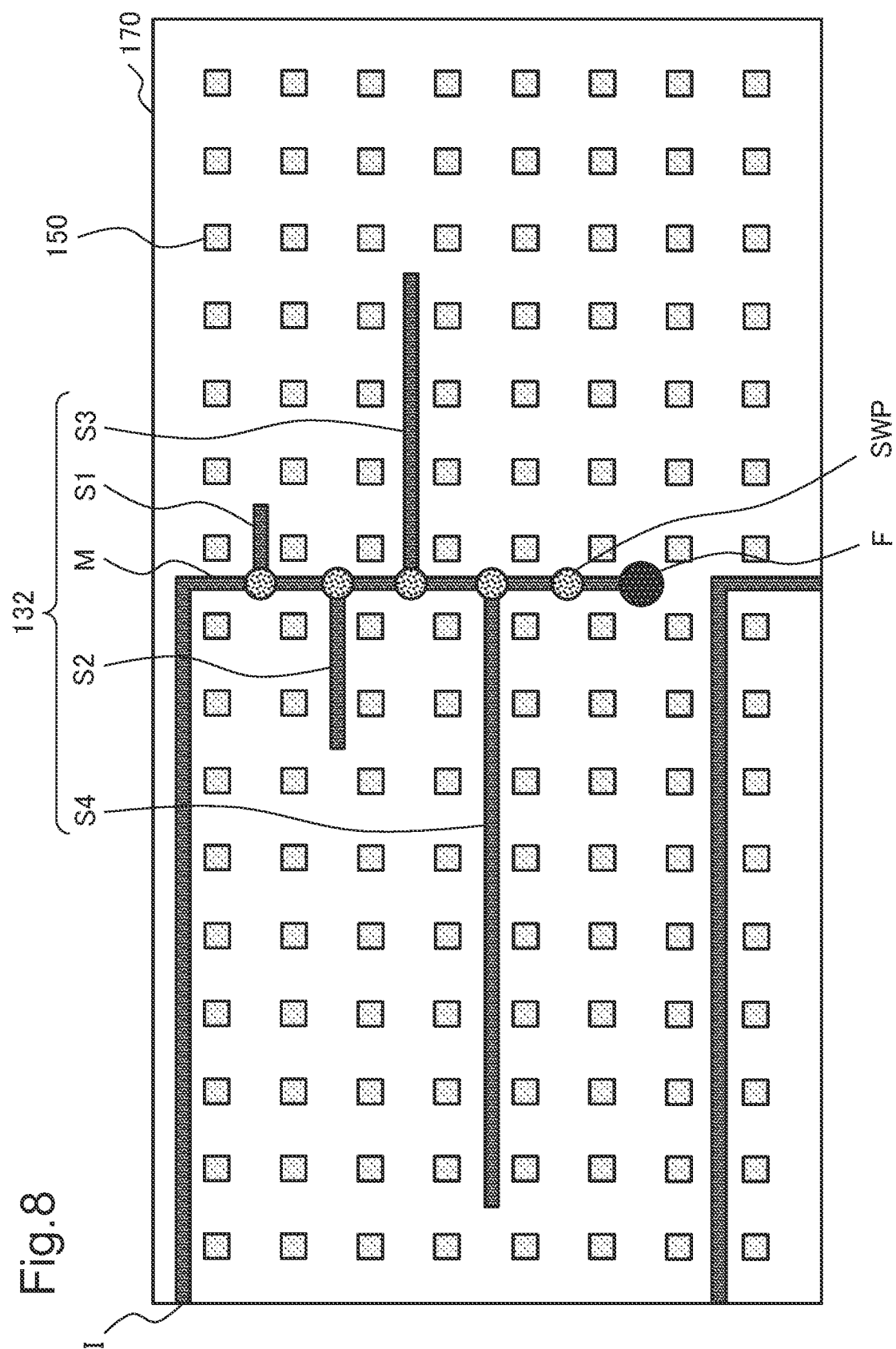
FIG. 8 is a conceptual diagram illustrating an example of a configuration of a phase shifter included in a display antenna according to the present disclosure.

FIG. 8 illustrates an example (phase shifter 132) of the phase shifter 13 disposed in the phase shifter forming layer 130. FIG. 8 is a plan view of the upper surface of the substrate 170 as viewed from an upper viewing seat. The phase shifter 132 is disposed between the plurality of light emitters 150 in top view. The phase shifter 132 is an example of a stub switching phase shifter. The phase shifter 132 has a configuration in which open stubs (S1, S2, S3, S4) having different line lengths are connected to the main line M via the phase shift switch SWP. In the example of FIG. 8, four open stubs (S1, S2, S3, S4) are connected to the main line M connecting the input terminal I to the power feeding point F. The signal having passed through the phase shifter 132 is phase-shifted by a phase shift amount relevant to the connection state between the main line M and the open stubs (S1, S2, S3, S4). The connection between the main line M and the open stubs (S1, S2, S3, S4) is switched according to the opening/closing control of the phase shift switch SWP by the control unit 17.

The open stub S1 is a stub that gives a phase difference of 22.5 degrees. The phase of the signal that has passed through the open stub S1 is shifted by 22.5 degrees with respect to the phase of the signal that has traveled through the main line M without passing through the open stub S1. The open stub S2 is a stub that gives a phase difference of 45 degrees. The phase of the signal that has passed through the open stub S2 is shifted by 45 degrees with respect to the phase of the signal that has traveled through the main line M without passing through the open stub S2. The open stub S3 is a stub that gives a phase difference of 90 degrees. The phase of the signal that has passed through the open stub S3 is shifted by 90 degrees with respect to the phase of the signal that has traveled through the main line M without passing through the open stub S3. The open stub S4 is a stub that gives a phase difference of 180 degrees. The phase of the signal that has passed through the open stub S4 is shifted by 180 degrees with respect to the phase of the signal that has traveled through the main line M without passing through the open stub S4. For example, the phase of the signal passing through the open stub S1 and the open stub S2 is shifted by 47.5 degrees with respect to the phase of the signal that has traveled through the main line M without passing through the open stub S1 and the open stub S2.

Figure 9:
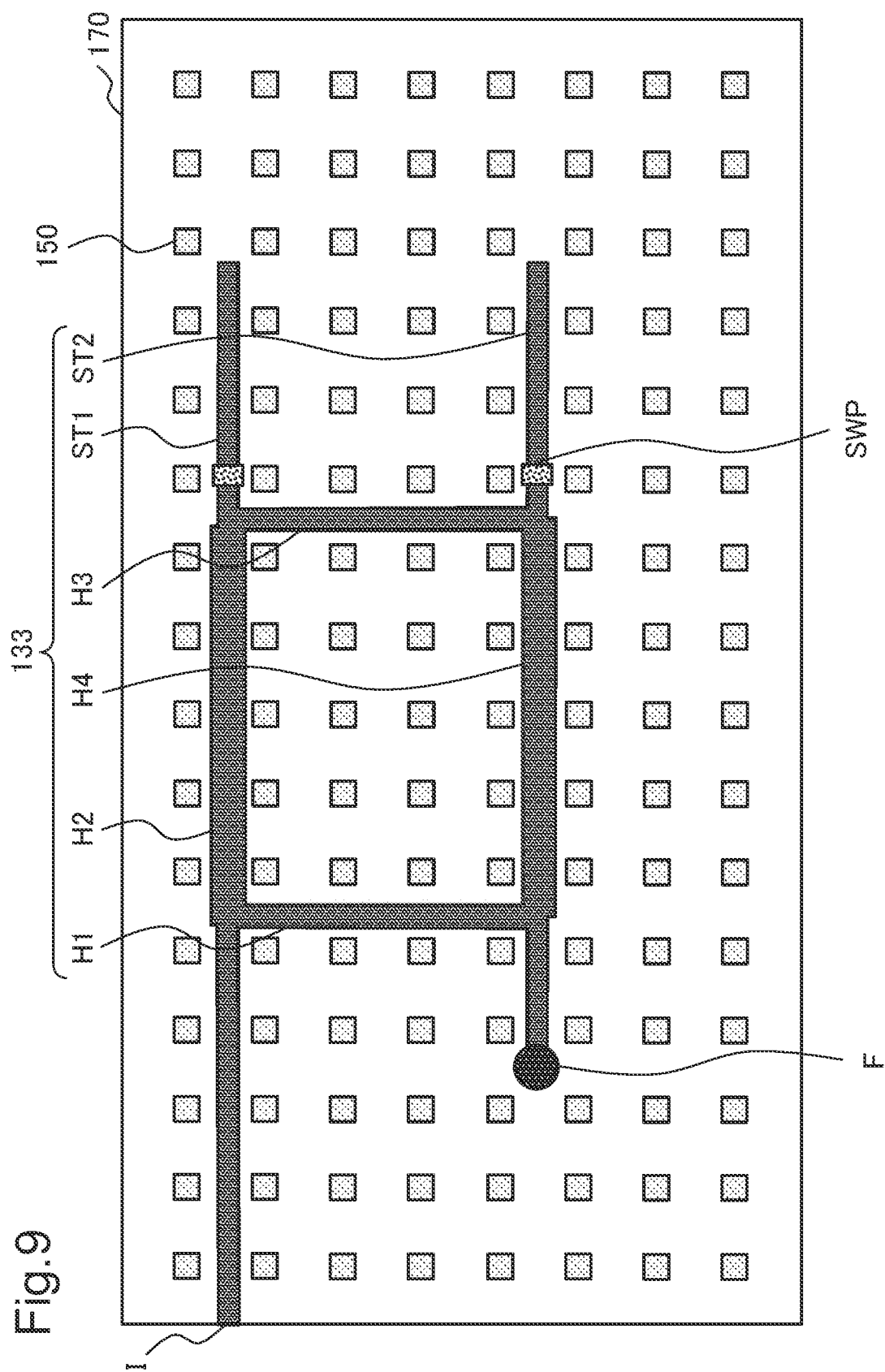
FIG. 9 is a conceptual diagram illustrating an example of a configuration of a phase shifter included in a display antenna according to the present disclosure.

FIG. 9 illustrates an example (phase shifter 133) of the phase shifter 13 disposed in the phase shifter forming layer 130. FIG. 9 is a plan view of the upper surface of the substrate 170 as viewed from an upper viewing seat. The phase shifter 133 is disposed between the plurality of light emitters 150 in top view. The phase shifter 133 is an example of a reflective phase shifter. The phase shifter 133 has a configuration in which a 90 degree hybrid circuit and a stub are combined. A transmission line H1, a transmission line H2, a transmission line H3, and a transmission line H4 constitute a 90 degree hybrid circuit. The electrical lengths of the transmission line H1, the transmission line H2, the transmission line H3, and the transmission line H4 forming the 90 degree hybrid circuit are λ/4 (90 degrees). The characteristic impedance of the transmission line H1 and the transmission line H3 is $Z_0$. The characteristic impedance of the transmission line H2 and the transmission line H4 is $Z_0/\sqrt{2}$.

The phase shifter 133 includes a stub ST1 and a stub ST2. In the example of FIG. 9, the stub ST1 and the stub ST2 are open stubs having an open end (right end). The stub ST1 and the stub ST2 may be short stubs whose open ends (right ends) are grounded. The lengths of the stub ST1 and the stub ST2 can be set to any value. The signals propagated to the stub ST1 and the stub ST2 are phase-shifted with a phase difference relevant to the length thereof. The lengths of the stub ST1 and the stub ST2 may be variable. For example, if a switch is disposed on a line of the stub ST1 and the stub ST2, the lengths of the stub ST1 and the stub ST2 can be changed by turning on/off the switch.

A first end (upper end) of the transmission line H1 is connected to the input terminal I. The first end (upper end) of the transmission line H1 is connected to a first end (left end) of the transmission line H2. A second end (lower end) of the transmission line H1 is connected to the power feeding point F. The second end (lower end) of the transmission line H1 is connected to a first end (left end) of the transmission line H4.

The first end (left end) of the transmission line H2 is connected to the input terminal I. The first end (left end) of the transmission line H2 is connected to the first end (upper end) of the transmission line H1. The second end (right end) of the transmission line H2 is connected to the stub ST1 via the phase shift switch SWP. The second end (right end) of the transmission line H1 is connected to a first end (upper end) of the transmission line H3.

The first end (upper end) of the transmission line H3 is connected to the second end (right end) of the transmission line H2. The first end (upper end) of the transmission line H3 is connected to the stub ST1 via the phase shift switch SWP. A second end (lower end) of the transmission line H3 is connected to the stub ST2 via the phase shift switch SWP. The second end (lower end) of the transmission line H3 is connected to a second end (right end) of the transmission line H4.

The first end (left end) of the transmission line H4 is connected to the power feeding point F. The first end (left end) of the transmission line H4 is connected to the second end (lower end) of the transmission line H1. The second end (right end) of the transmission line H4 is connected to the second end (lower end) of the transmission line H3. The second end (right end) of the transmission line H4 is connected to the stub ST2 via the phase shift switch SWP.

The signal having passed through the phase shifter 13 is phase-shifted by a phase shift amount relevant to the electrical length of the passed line or stub according to the opening/closing state of the SW. The phase shift amount of the phase shifter 13 is switched according to the opening/closing control of the phase shift switch SWP by the control unit 17.

A ground electrode 173 is disposed in a shield layer above the display 15 and the phase shifter forming layer 130 configured by the plurality of light emitters 150 (FIG. 4). The ground electrode 173 is formed to prevent electromagnetic coupling above and below the ground electrode 173. The ground electrode 173 is made of a transparent conductor. For example, similarly to the patch antenna P, the ground electrode 173 is made of a material such as indium tin oxide, zinc oxide, tin oxide, or titanium oxide. The material of the ground electrode 173 is not limited as long as light in the wavelength band of the visible region can be transmitted. The ground electrode 173 is connected to the housing and the ground terminal by a conductive wire (not illustrated) or the like. The potential of the ground electrode 173 is the same potential as the ground point to which the ground electrode 173 is connected. Therefore, a capacitance according to the dielectric constant of the dielectric layer or space formed between the ground electrode 173 and the phase shifter 13 or the wiring formed in the patch antenna P or the phase shifter forming layer 130 is formed.

A plurality of patch antennas P are disposed above the shield layer on which the ground electrode 173 is formed. The plurality of patch antennas P are electrically connected to the power feeding point F of the phase shifter 13 formed in the phase shifter forming layer 130 via the power feeding electrode FE. The power feeding electrode FE is a conductive via that electrically connects the patch antenna P and the power feeding point of the phase shifter 13. The material of the power feeding electrode FE is not particularly limited as long as it has conductivity.

A protective layer 177 is formed above the plurality of patch antennas P. The protective layer 177 is formed of a member capable of transmitting light in a wavelength band of the visible region. The material of the protective layer 177 is not limited as long as light in the wavelength band of the visible region can be transmitted. For example, the protective layer 177 is achieved by a transparent member such as glass or plastic.

A dielectric layer (not illustrated) is formed in a space between the wiring layer 171 and the protective layer 177. The dielectric layer is formed of a dielectric capable of transmitting light in a wavelength band of a visible region. The space between the wiring layer 171 and the protective layer 177 may be filled with a dielectric forming the dielectric layer, or a gap may be formed. The material, shape, and position of the dielectric layer are not particularly limited.

A signal to be transmitted is output from a transmission circuit (not illustrated). The signal output from the transmission circuit reaches the phase shifter 13 through a signal line (not illustrated). The transmission signal that has reached the phase shifter 13 is phase-shifted by the phase shift amount set in phase shifter 13. The signal having passed through the phase shifter 13 reaches the patch antenna P via the power feeding electrode FE. The signal having reached the patch antenna P is transmitted as a radio wave in a wavelength band to be transmitted. The transmission direction of the radio wave transmitted from the display antenna 10 is controlled for each antenna assembly AE.

The reception-target radio wave received by the patch antenna P is phase-shifted by the phase shift amount set in the phase shifter 13 connected to the patch antenna P. The phase-shifted signal is received by a reception circuit (not illustrated) through a signal line. Information included in the signal received by the reception circuit is decoded by a decoder (not illustrated).

The control unit 17 (control means) controls the antenna array 11 to form the antenna assembly AE. The control unit 17 sets the size of the antenna assembly AE in accordance with the frequency band of the radio wave to be transmitted and received. The control unit 17 changes the combination of the patch antennas P forming the antenna assembly AE by switching on/off of a first switch (not illustrated) disposed between the patch antennas P. As a result, the size of the antenna assembly AE is set in accordance with the frequency band of the radio wave to be transmitted and received.

For example, when the frequency band of the radio wave to be transmitted and received is 70 GHz, the control unit 17 sets the size of the antenna assembly AE such that the antenna assembly AE has a square region with one side of 6.8 mm. The control unit 17 switches the plurality of first switches to combine 16 (4×4) patch antennas P each having a side of 1.7 mm. The control unit 17 switches the plurality of first switches such that the 16 patch antennas P have the same potential. As a result, 16 patch antennas P arrayed in 4×4 are combined to set the antenna assembly AE of a rectangular region having one side of 6.8 mm. The control unit 17 sets a plurality of antenna assemblies AE for the antenna array 11. The control unit 17 sets the first switch used for connection between the adjacent antenna assemblies AE to OFF. When the plurality of antenna assemblies AE are combined to form a larger antenna assembly AE, the control unit 17 sets the first switch used for connection between the adjacent antenna assemblies AE to ON. In this case, the control unit 17 sets the first switch used for connection between the adjacent antenna assemblies AE to ON in accordance with the wavelength band of the radio wave to be transmitted and received.

Figure 10:
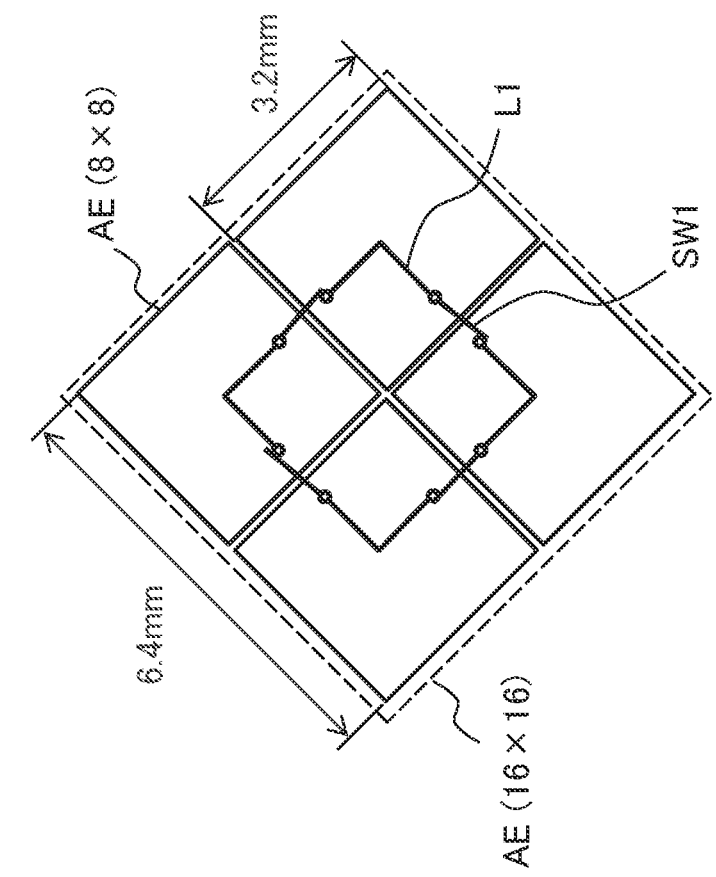
FIG. 10 is a conceptual diagram illustrating an example of an antenna assembly configured by an antenna array included in a display antenna according to the present disclosure.

FIG. 10 is a conceptual diagram illustrating an example of a configuration of the antenna assembly AE (16×16) set according to the size of a finger. In the example of FIG. 10, one side of one antenna assembly AE (8×8) is 3.2 mm. In the example of FIG. 10, the antenna assembly AE (8×8) is related to a frequency band of 300 GHz. The control unit 17 sets the antenna assembly AE (16× 16) by combining the four antenna assemblies AE (8×8) such that a square region having one side of 6.4 mm is formed according to the size of a finger. The control unit 17 switches a plurality of first switches SW1 to combine four antenna assemblies AE (8×8) each having a side of 3.2 mm. As a result, 256 patch antennas 111 arrayed in 16×16 are combined, and an antenna assembly AE (16×16) having a rectangular region with one side of 6.4 mm is set. The control unit 17 sets a plurality of antenna assemblies AE functioning as touch sensors for the antenna array 11.

The control unit 17 also sets a phase shift amount of the phase shifter 13. The control unit 17 switches on/off of the phase shift switch SWP disposed in the phase shifter 13 to set the phase shift amount of the phase shifter 13. The control unit 17 supplies a signal to be transmitted to a signal line connected to the input terminal I of the phase shifter 13 for which the phase shift amount is set. The control unit 17 switches on a switch (not illustrated) that switches connection between the patch antennas P forming the antenna assembly AE used for transmission of radio waves and a signal source (not illustrated). The signal source is a radio-frequency power source used for transmission of a radio wave to be transmitted. The signal source supplies radio-frequency power relevant to the frequency band of the radio wave to be transmitted and the transmission strength of the radio wave. The antenna assembly AE including the patch antenna P connected to the signal source is supplied with radio-frequency power from the signal source. As a result, the transmission target signal supplied from the signal line is phase-shifted according to the phase shift amount of the phase shifter 13 and transmitted from the antenna assembly AE.

The control unit 17 selects the antenna assembly AE to be caused to function as a touch sensor. The control unit 17 selects adjacent antenna assemblies AE such that the plurality of antenna assemblies AE to be caused to function as the touch sensor are arranged in a mesh pattern. The control unit 17 electrically connects two adjacent antenna assemblies AE among the selected antenna assemblies AE. In the antenna assembly AE that functions as the touch sensor, the first switch SW1 disposed on the wiring connecting the two adjacent antenna assemblies AE is switched to ON. As a result, a mesh-like touch sensor is formed by the plurality of antenna assemblies AE connected by the first switch SW1 switched to ON. The contact position can be specified according to a change in capacitance at an intersection of a row constituted by the plurality of antenna assemblies AE coupled in the X direction and a column constituted by the plurality of antenna assemblies AE coupled in the Y direction. Details of the detection of the contact position by the control unit 17 will not be described.

For example, the control unit 17 selects a combination of the patch antennas P forming the antenna assembly AE set according to the size of a finger. The combination of the patch antennas P is selected according to the size of the indicator including a finger. In the case of the example of FIG. 3 described above, one electrode for the touch sensor is configured by the antenna assembly AE configured by 16 (4×4) patch antennas P. The control unit 17 electrically connects the antenna assemblies AE forming the touch sensors $TS_X$ arranged in the X direction by switching the first switch SW1 disposed on a wiring $L_X$ in the X direction to ON. The control unit 17 electrically connects the antenna assemblies AE forming the touch sensors $TS_Y$ arranged in the Y direction by switching the first switch SW1 disposed in a wiring $L_Y$ in the Y direction to ON. The antenna assembly AE used as the touch sensor may include patch antennas P of which the number is not 16 (4×4). For example, the antenna assembly AE used as the touch sensor may include 64 (8× 8) patch antennas P. For example, the antenna assembly AE used as the touch sensor may include four (2×2) patch antennas P.

Figure 11:
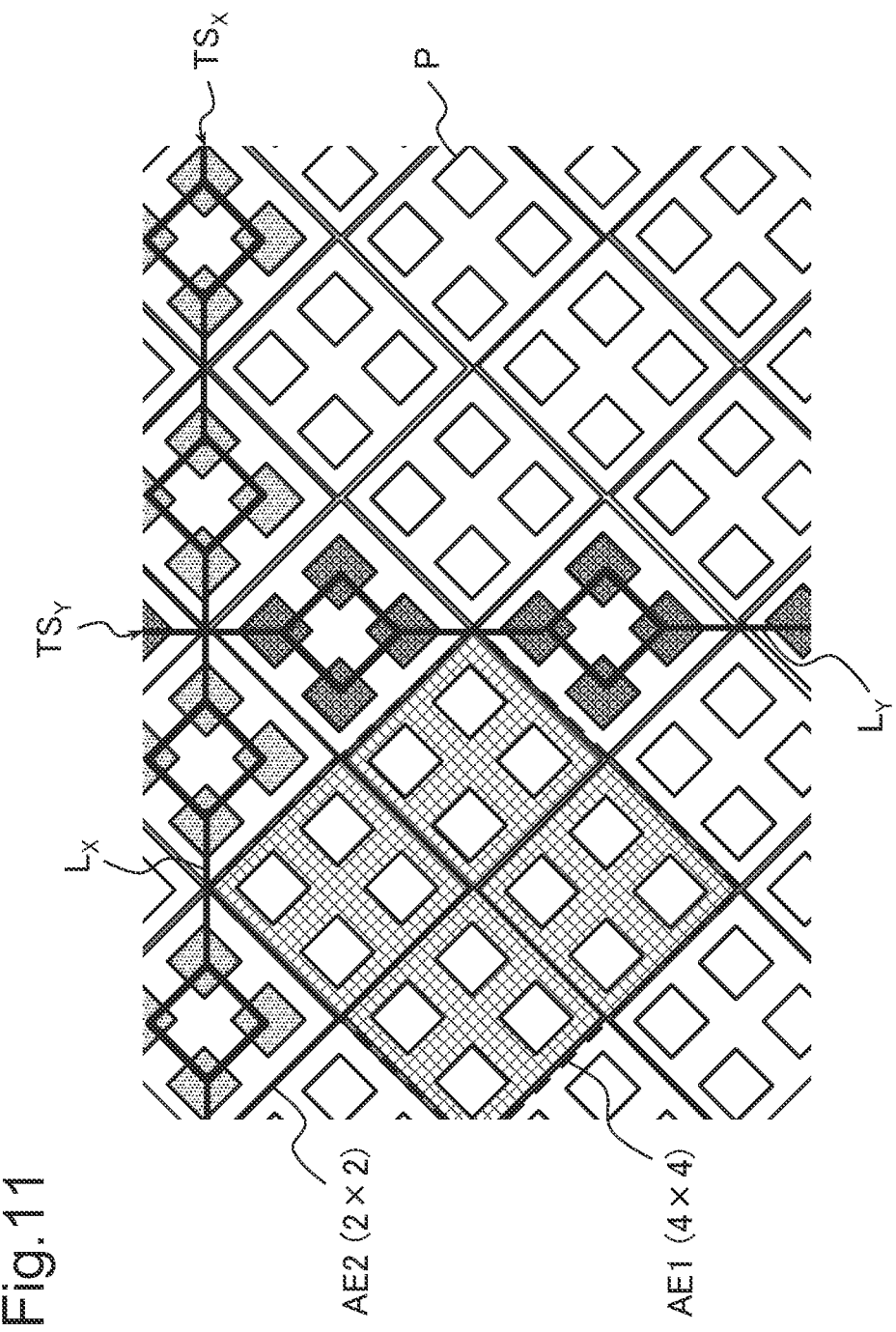
FIG. 11 is a conceptual diagram illustrating an example of a touch sensor configured by an antenna array included in a display antenna according to the present disclosure.

FIG. 11 is a conceptual diagram illustrating a setting example of the touch sensor in the antenna array 11. FIG. 11 illustrates an example in which the numbers of patch antennas P forming an antenna assembly AE1 that functions as the phased array antenna and an antenna assembly AE2 that functions as the touch sensor are different. The control unit 17 switches the plurality of first switches SW1, and combines 16 (4×4) patch antennas P each having a side of 3.0 mm to form the antenna assembly AE1. As a result, 16 patch antennas P arrayed in 4×4 are combined to set the antenna assembly AE1 having a rectangular region with one side of 12 mm. For example, the antenna assembly AE1 having a rectangular area with one side of 12 mm is used for transmission and reception of a radio wave having a frequency band of 40 GHz. The control unit 17 sets a plurality of antenna assemblies AE1 with respect to the antenna array 11.

In the example of FIG. 11, the control unit 17 selects the antenna assembly AE2 to be caused to function as the touch sensor. The control unit 17 switches the plurality of first switches SW1, and combines four (2×2) patch antennas P each having a side of 3.0 mm to form the antenna assembly AE. As a result, the four patch antennas P arranged in 2×2 are combined to form the antenna assembly AE2 functioning as a touch sensor. The control unit 17 switches on the first switch SW1 disposed on the wiring $L_X$ between the antenna assemblies AE2 functioning as the touch sensor $TS_X$ for position detection in the X direction. The control unit 17 switches on the first switch SW1 disposed on the wiring $L_Y$ between the antenna assemblies AE2 functioning as the touch sensor $TS_Y$ for position detection in the Y direction. As a result, a touch panel in which the touch sensor $TS_X$ for position detection in the X direction and the touch sensor $TS_Y$ for position detection in the Y direction are disposed in a mesh shape is configured.

Furthermore, the control unit 17 controls display on the display 15. The control unit 17 causes the plurality of light emitters 150 forming the display 15 to emit light so that a user interface for accepting an operation input is displayed. The control unit 17 causes the plurality of light emitters 150 to emit light so that display information for performing selection and operation at the detection position is displayed in association with the detection position of the touch panel set in the antenna array 11. In a case where the user interface is not displayed, the control unit 17 may cause the plurality of light emitters 150 forming the display 15 to emit light so that an image unrelated to the touch panel is displayed. A display control unit (not illustrated) other than the control unit 17 may be used for display control of the display 15.

Figure 12:
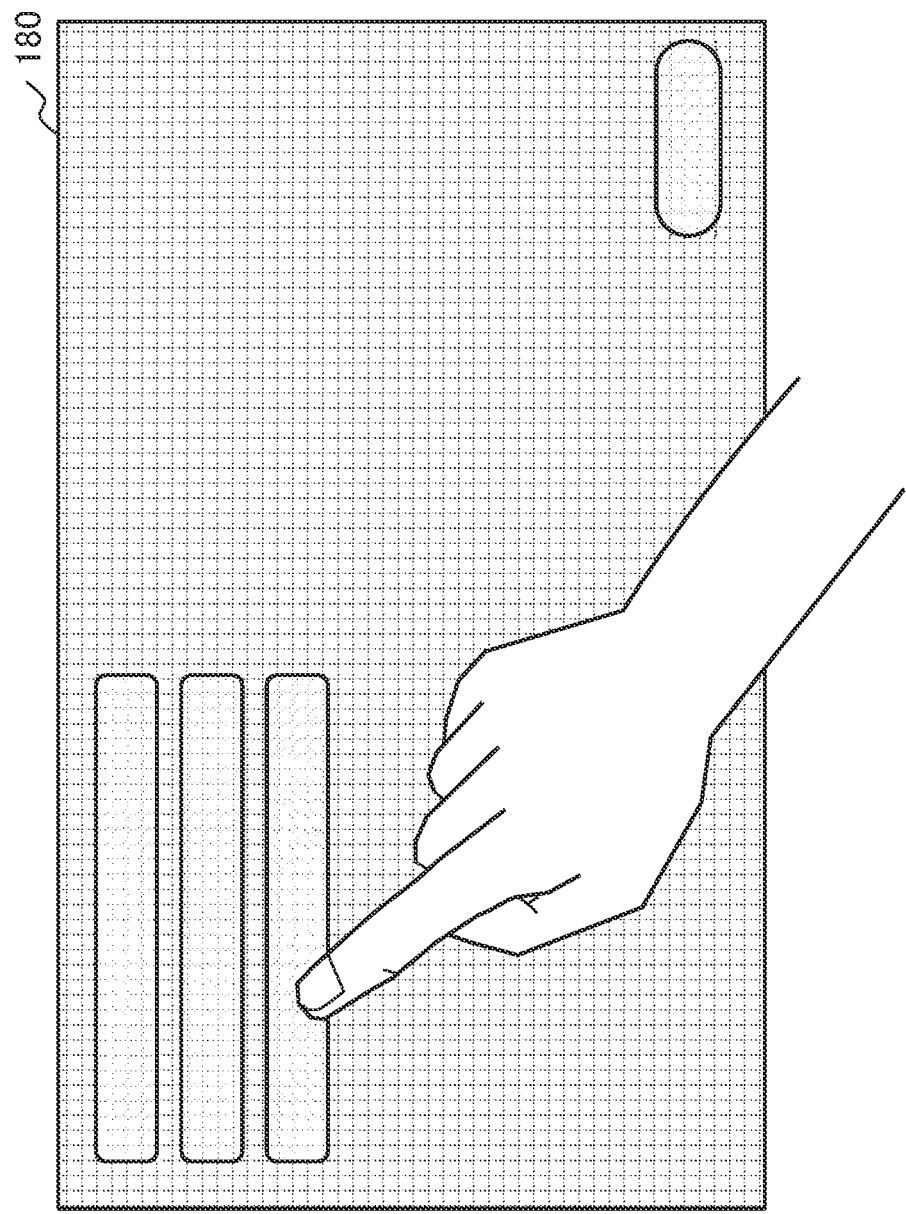
FIG. 12 is a conceptual diagram illustrating an example of a user interface displayed on a screen of a terminal device on which a display antenna according to the present disclosure is mounted.

FIG. 12 is a conceptual diagram illustrating an example in which the display antenna 10 is mounted on a terminal device used by a user. On a screen 180 of the terminal device, an image of the display 15 included in the display antenna 10 is displayed. The function of the touch panel of the display antenna 10 is set on the screen 180 of the terminal device. FIG. 12 illustrates an example in which a user interface is displayed on the screen 180. FIG. 12 illustrates a state in which one of the buttons included in the user interface displayed on the screen 180 is selected by the user. In FIG. 12, images in the row direction and the column direction of the touch sensors forming the touch panel are illustrated in a mesh-like pattern, but the size and interval of the touch sensors to be actually formed are not accurately represented.

In the example of FIG. 12, the display antenna 10 detects a position touched by a user's finger. The display antenna 10 receives an input relevant to the display information displayed at the detected position. A portion of the screen 180 of the terminal device that does not function as a touch panel functions as a phased array antenna. As described above, the display antenna 10 can simultaneously exert the function of the touch panel and the function of the phased array antenna. The display antenna 10 may express only the function of the touch panel. The display antenna 10 may express only the function of the phased array antenna.

Modification

Next, modifications of the display antenna 10 of the present example embodiment will be described. Here, five modifications will be described. In the following description of the modifications, description of portions similar to those of the display antenna 10 is omitted.

First Modification

Figure 13:
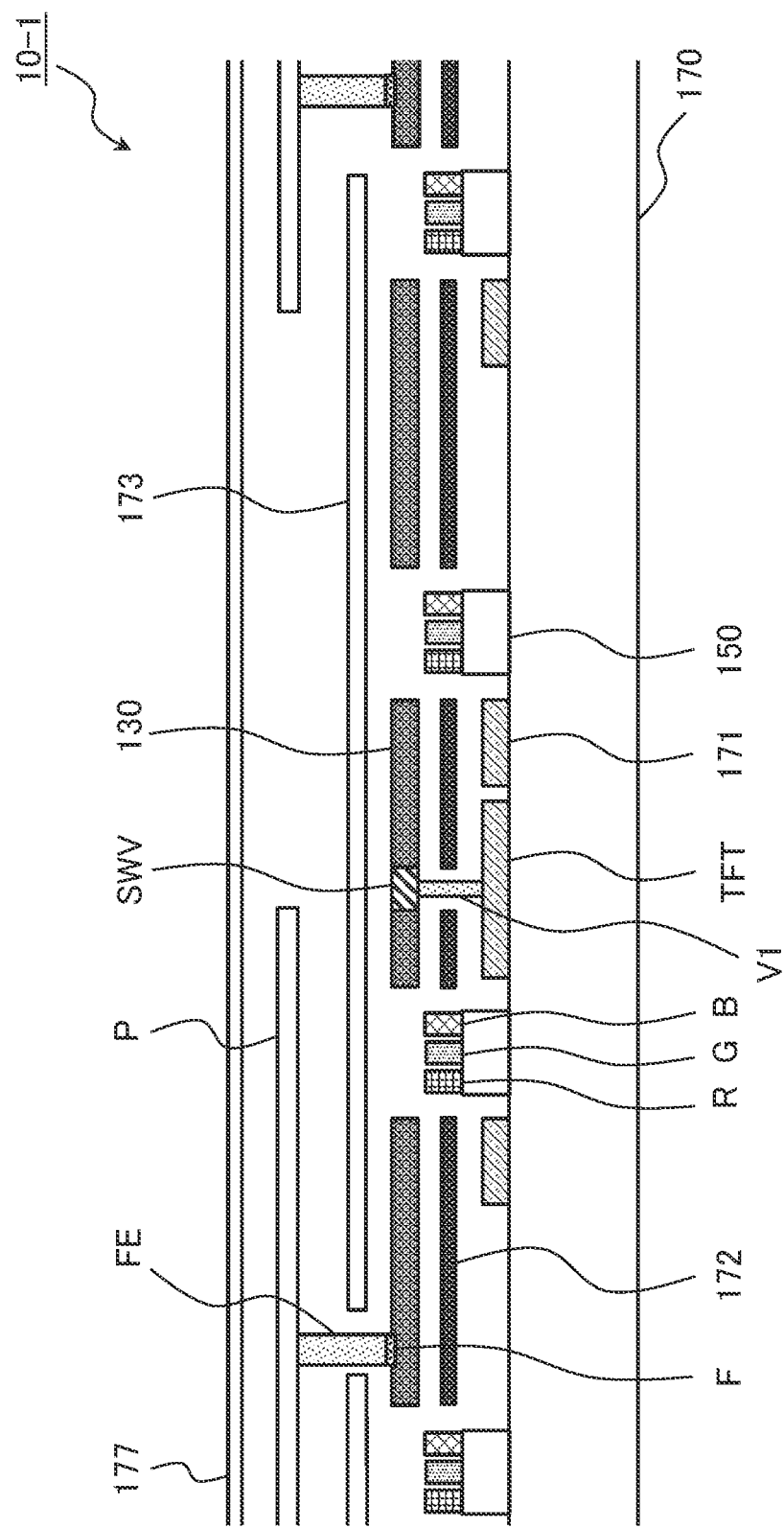
FIG. 13 is a cross-sectional view illustrating an example of an internal configuration of a display antenna according to the present disclosure.

FIG. 13 is a conceptual diagram illustrating an example of a configuration of a display antenna 10-1 according to a first modification. FIG. 13 illustrates an example of a cross-sectional structure of the display antenna 10-1. The display antenna 10-1 is an example of a configuration that implements the phase shift switch SWP included in at least some of the phase shifters 13 disposed in the phase shifter forming layer 130. In the present modification, an example in which a switch SWV utilizing metal-insulator phase transition (Hereinafter, referred to as a phase transition) of vanadium dioxide $VO_2$ is used will be described. The switch SWV is connected to a thin film transistor (TFT) that performs opening/closing control of the switch SWV via a via V1.

Figure 14:
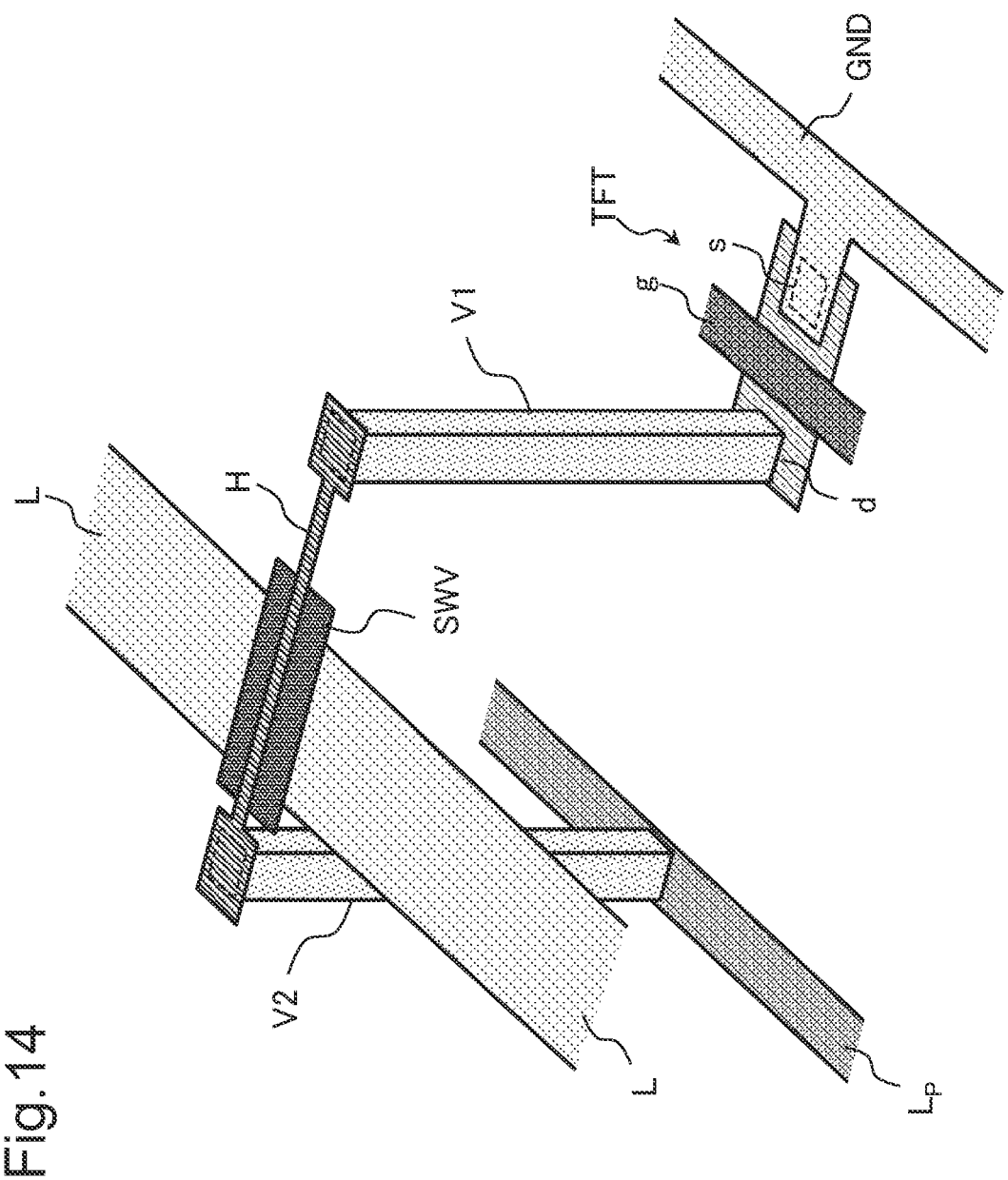
FIG. 14 is a conceptual diagram illustrating an example of a configuration of a switch included in a display antenna according to the present disclosure.

FIG. 14 is a conceptual diagram illustrating an example of a configuration for implementing the switch SWV. The switch SWV of FIG. 14 includes a thin film of vanadium dioxide $VO_2$. When the temperature of the vanadium dioxide $VO_2$ is increased from room temperature, the electrical resistance of the vanadium dioxide $VO_2$ rapidly decreases at around 67 degrees Celsius, and the vanadium dioxide $VO_2$ undergoes a phase transition from an insulator to a metal. The vanadium dioxide $VO_2$ is an insulating phase at a temperature lower than the phase transition temperature. The vanadium dioxide $VO_2$ is a metal phase at a temperature higher than the phase transition temperature. In the actual phase transition of the vanadium dioxide $VO_2$, hysteresis occurs when the temperature rises and falls. Therefore, the temperature is designed such that turning ON/OFF of the switch SWV is switched in consideration of hysteresis.

In the example of FIG. 14, the switch SWV is disposed on a wiring L included in the phase shifter 13. For example, the switch SWV is disposed at a connection point between a branch line, a stub, or the like and a main line. An electric heating wire H is thermally connected to the switch SWV. The first end of the electric heating wire H is electrically connected to a power supply line $L_P$ through a via V2. The second end of the electric heating wire H is electrically connected to a drain d of the TFT through a via V1. The electric heating wire H is used to control the temperature of the thin film of the vanadium dioxide $VO_2$ included in the switch SWV. For example, the electric heating wire H is achieved by an alloy containing nickel Ni or chromium Cr as a main component. The electric heating wire H may be achieved by an alloy containing chromium Cr, iron Fe, and aluminum Al as main components. The material of the electric heating wire H is not particularly limited as long as the material is a material whose temperature is likely to rise in response to application of a current.

The supply of the current to the electric heating wire H can be controlled using a TFT. When a voltage exceeding a threshold voltage is applied to a gate g of the TFT, the TFT is turned on. When the TFT is turned on, the source s and the drain d connected to the ground line GND are at the same potential (0 V), a current is supplied to the electric heating wire H through the power supply line $L_P$, and the temperature of the electric heating wire rises. The heat of the electric heating wire H is transferred to the thin film of the vanadium dioxide $VO_2$ included in the switch SWV. When the temperature of the thin film of the vanadium dioxide $VO_2$ included in the switch SWV exceeds the phase transition temperature, the thin film undergoes phase transition to the metal phase. As a result, the switch SWV transitions to an ON state, and the wiring L in which the switch SWV is interposed is conducted. When the supply of the current to the electric heating wire H is stopped, the temperature of the electric heating wire H decreases. When the temperature of the thin film of the vanadium dioxide $VO_2$ included in the switch SWV falls below the phase transition temperature, the thin film undergoes phase transition to an insulating phase. As a result, the switch SWV transitions to an OFF state, and the wiring L including the switch SWV is cut off.

According to the present modification, the display antenna 10-1 can be collectively manufactured by a semiconductor process by using the switch SWV including the thin film of the vanadium dioxide $VO_2$. According to the present modification, the phase shifter 13 formed in the phase shifter forming layer 130 can be downsized. The switch SWV including the thin film of the vanadium dioxide $VO_2$ may be applied to other switches included in the display antenna 10-1.

Second Modification

Figure 15:
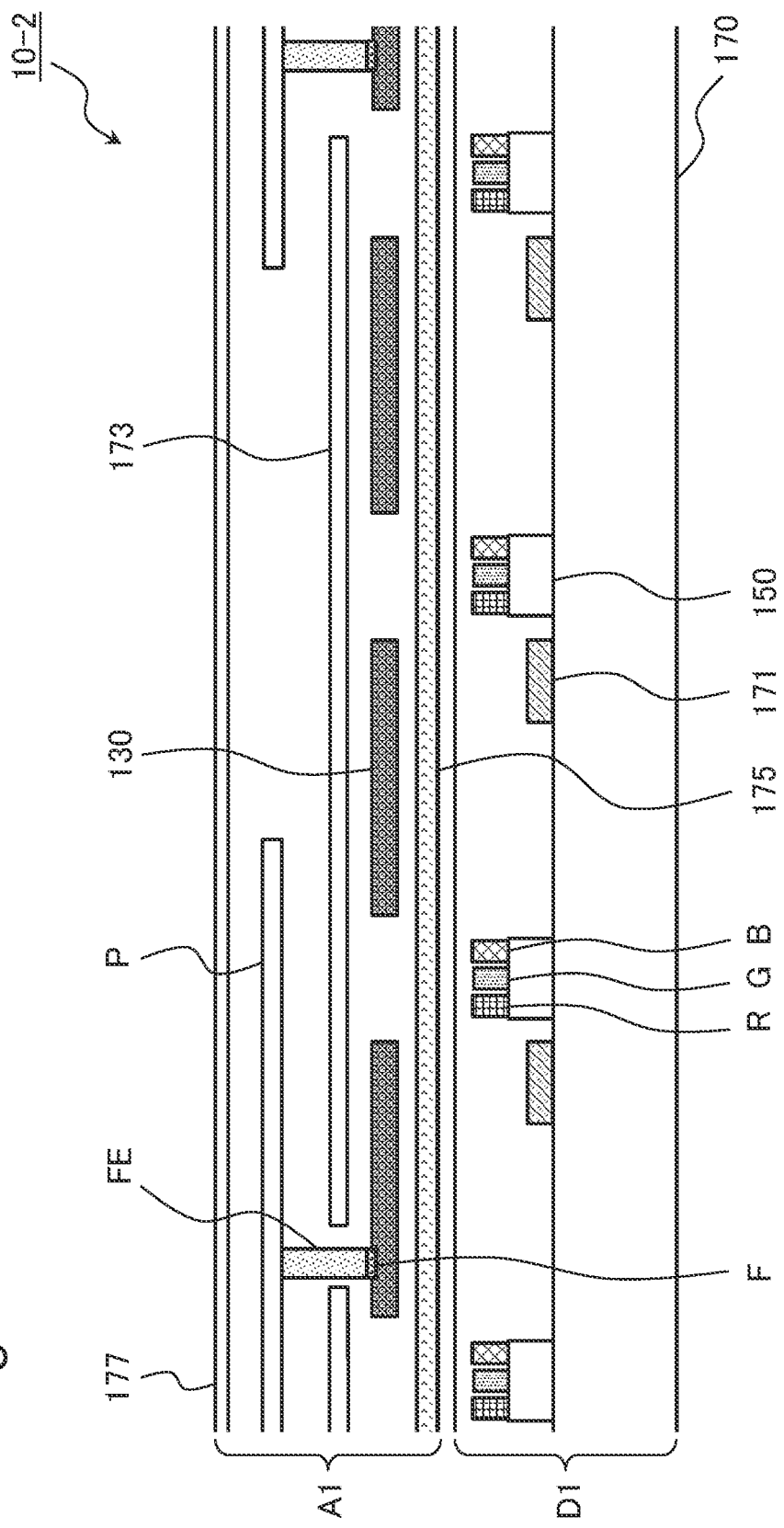
FIG. 15 is a cross-sectional view illustrating an example of an internal configuration of a display antenna according to the present disclosure.

FIG. 15 is a conceptual diagram illustrating an example of a configuration of a display antenna 10-2 according to a second modification. FIG. 15 illustrates an example of a cross-sectional structure of the display antenna 10-2. The display antenna 10-2 has a configuration in which an antenna function (antenna A1) and a display function (display D1) are divided. The antenna A1 is stacked above the display D1.

In the lowermost layer of the antenna A1, a shield layer 175 is formed instead of the shield electrode 172. The shield layer 175 is formed to prevent electromagnetic coupling above and below the shield layer 175. The shield layer 175 is made of a transparent conductor. For example, similarly to the patch antenna P, the shield layer 175 is made of a material such as indium tin oxide, zinc oxide, tin oxide, or titanium oxide. The material of the shield layer 175 is not limited as long as light in the wavelength band of the visible region can be transmitted. The shield layer 175 is connected to the housing and the ground terminal by a conductive wire (not illustrated) or the like. The potential of the shield layer 175 is the same potential as the ground point to which the shield layer 175 is connected.

A flattening film or a protective film is formed on the display D1. The flattening film and the protective film are transparent materials through which light in a wavelength band of a visible region can pass. The materials of the flattening film and the protective film are not limited as long as light in the wavelength band of the visible region can be transmitted. For example, the flattening film and the protective film are achieved by silicon oxide or the like. The antenna A1 is disposed above the display D1. The phase shifter forming layer 130 included in the antenna A1 is disposed so as to avoid a region above the light emitter 150 included in the display D1.

According to the present modification, the antenna A1 and the display D1 can be manufactured individually. For example, the antenna A1 and the display D1 may be manufactured in different factories. As described above, according to the present modification, the degree of freedom in manufacturing the display antenna 10-2 is improved.

Third Modification

Figure 16:
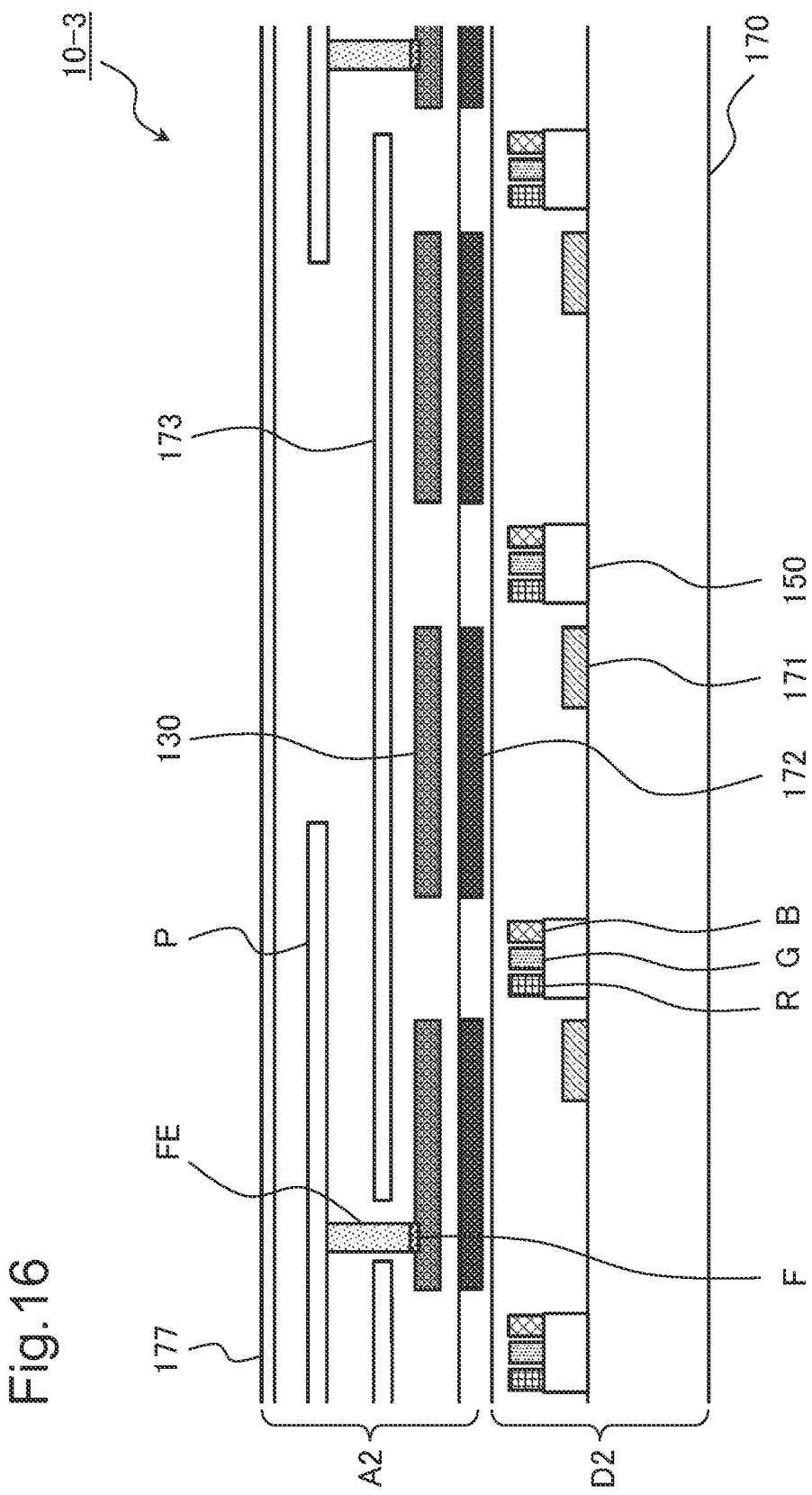
FIG. 16 is a cross-sectional view illustrating an example of an internal configuration of a display antenna according to the present disclosure.

FIG. 16 is a conceptual diagram illustrating an example of a configuration of a display antenna 10-3 according to a third modification. FIG. 16 illustrates an example of a cross-sectional structure of the display antenna 10-3. The display antenna 10-3 has a configuration in which an antenna function (antenna A2) and a display function (display D2) are divided. The antenna A2 is stacked above the display D2.

The shield electrode 172 is formed on the lowermost layer of the antenna A2. The shield electrode 172 is formed to prevent electromagnetic coupling between the display D2 disposed above the shield electrode 172 and below the shield electrode 172. The material of the shield electrode 172 is not particularly limited as long as it has conductivity. For example, the shield electrode 172 is achieved by a material containing metal such as aluminum or copper. The shield electrode 172 is connected to the housing or the ground terminal by a conductive wire (not illustrated) or the like. The potential of the shield electrode 172 is the same potential as the ground point to which the shield electrode 172 is connected.

A flattening film or a protective film is formed on the display D2. The flattening film and the protective film are transparent materials through which light in a wavelength band of a visible region can pass. The materials of the flattening film and the protective film are not limited as long as light in the wavelength band of the visible region can be transmitted. For example, the flattening film and the protective film are achieved by silicon oxide or the like. The antenna A2 is disposed above the display D2. The phase shifter forming layer 130 and the shield electrode 172 included in the antenna A2 are disposed so as to avoid a region above the light emitter 150 included in the display D2.

According to the present modification, the antenna A2 and the display D2 can be manufactured individually. For example, the antenna A2 and the display D2 may be manufactured in different factories. As described above, according to the present modification, the degree of freedom in manufacturing the display antenna 10-3 is improved.

Fourth Modification

Figure 17:
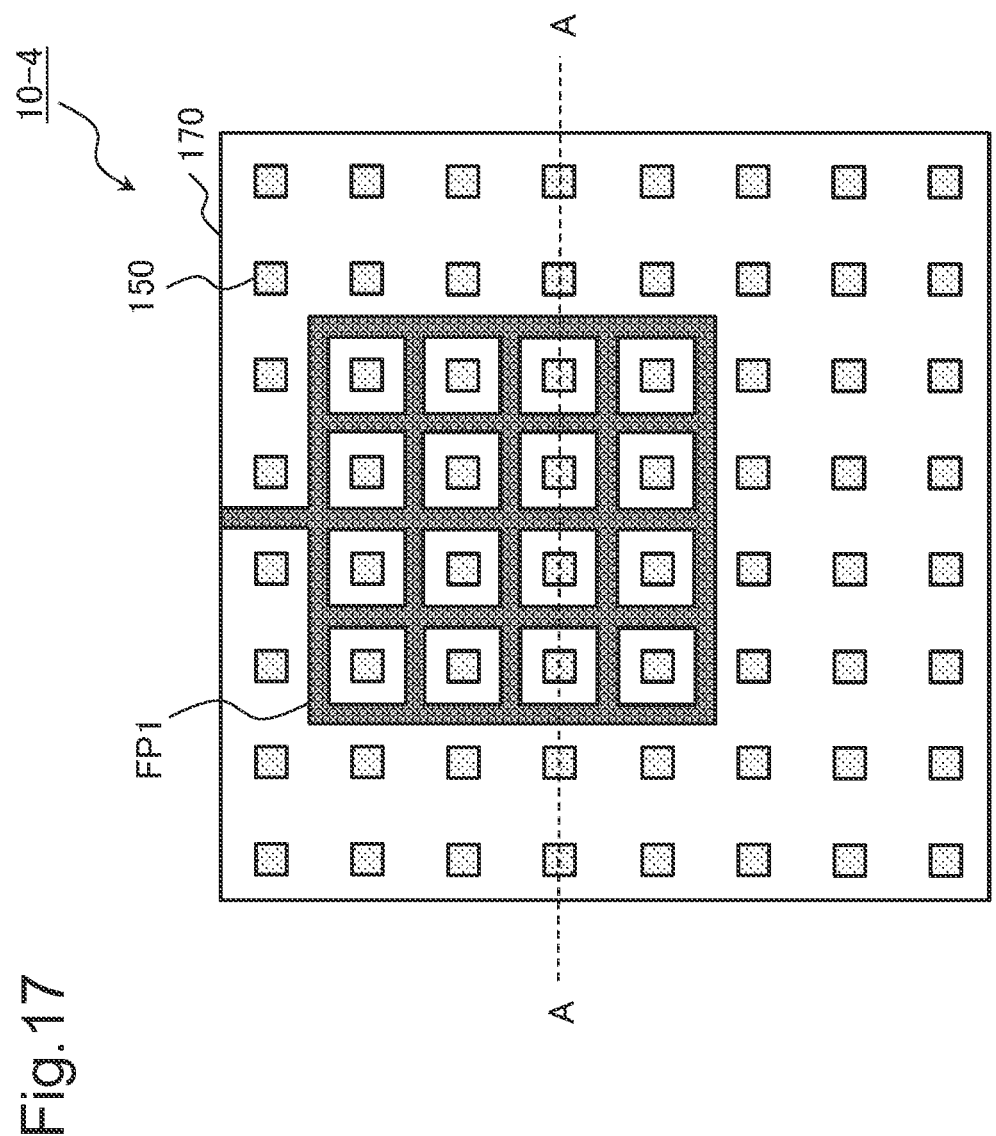
FIG. 17 is a cross-sectional view illustrating an example of a power feeding electrode pattern included in the display antenna according to the present disclosure.

FIG. 17 is a conceptual diagram for explaining an example of a configuration of a display antenna 10-4 according to a fourth modification. FIG. 17 is a plan view of the upper surface of the substrate 170 on which the display 15 is configured as viewed from an upper viewing seat. FIG. 17 illustrates an example in which a power feeding electrode pattern FP1 is formed in the upper region between the light emitters 150.

Figure 18:
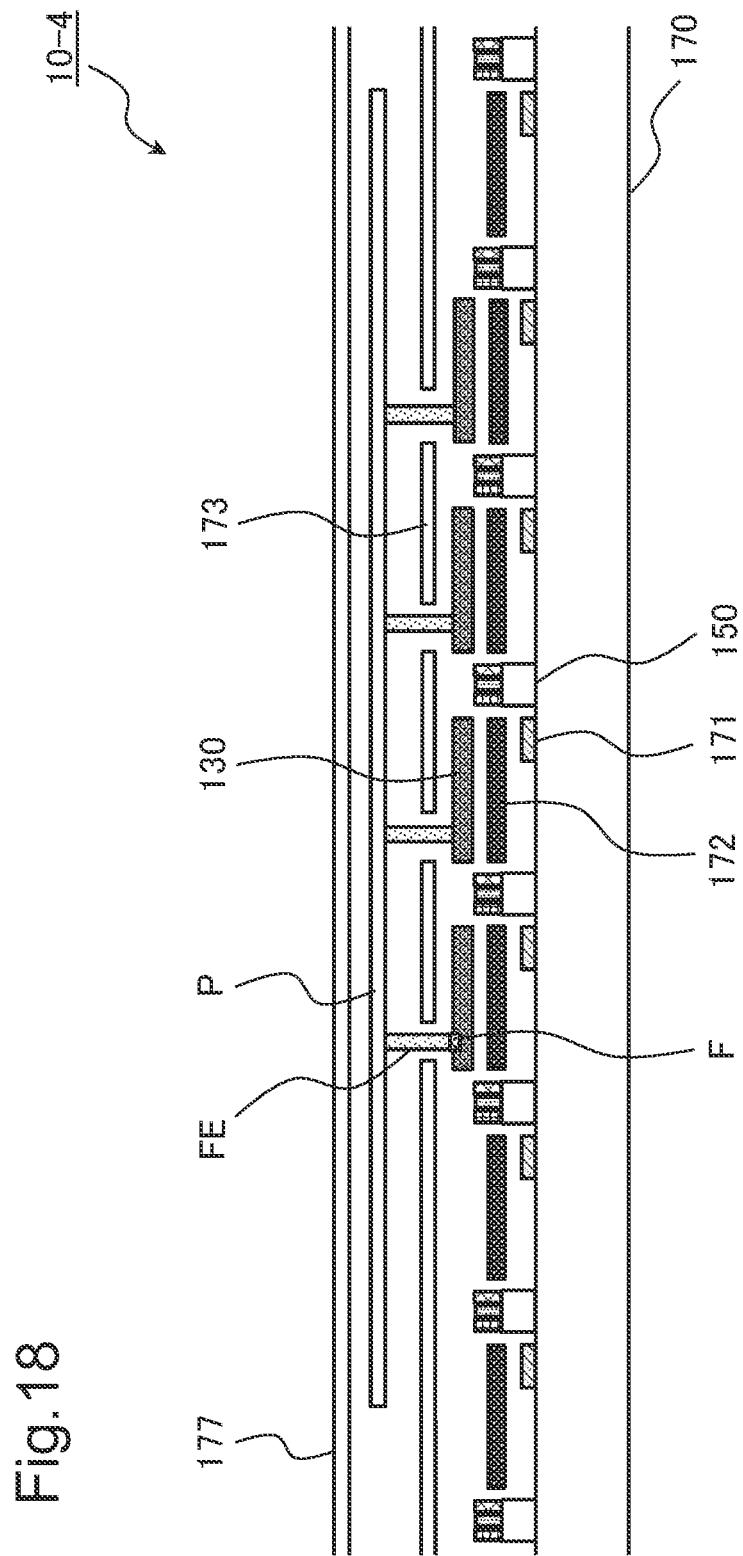
FIG. 18 is a cross-sectional view illustrating an example of an internal configuration of a display antenna according to the present disclosure.

FIG. 18 is a cross-sectional view illustrating an example of a cross section taken along line A-A in FIG. 17. In the cross-sectional view of FIG. 18, there are some places from which hatching is omitted. The power feeding electrode FE forming the power feeding electrode pattern FP1 electrically connects the power feeding point F of the phase shifter 13 formed in the phase shifter forming layer 130 and the patch antenna P.

According to the present modification, the area of the portion where the phase shifter 13 and the patch antenna P are connected can be set larger than that in the case where the phase shifter 13 and the patch antenna P are connected by one power feeding electrode FE.

Fifth Modification

Figure 19:
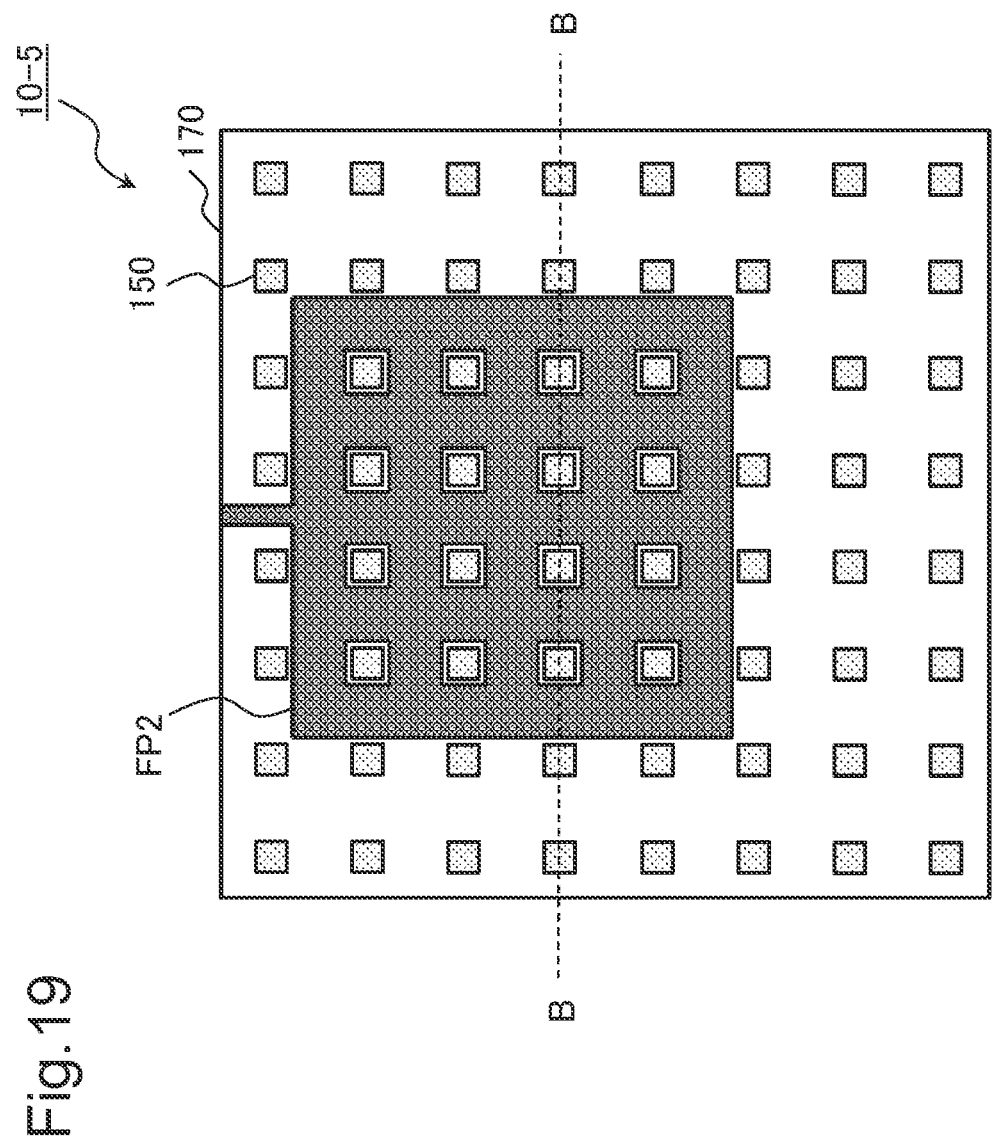
FIG. 19 is a cross-sectional view illustrating an example of a power feeding electrode pattern included in the display antenna according to the present disclosure.

FIG. 19 is a conceptual diagram for explaining an example of a configuration of a display antenna 10-5 according to a fifth modification. FIG. 19 is a plan view of the upper surface of the substrate 170 on which the display 15 is configured as viewed from an upper viewing seat. FIG. 19 illustrates an example in which a power feeding electrode pattern FP2 is formed in the upper region between the light emitters 150.

Figure 20:
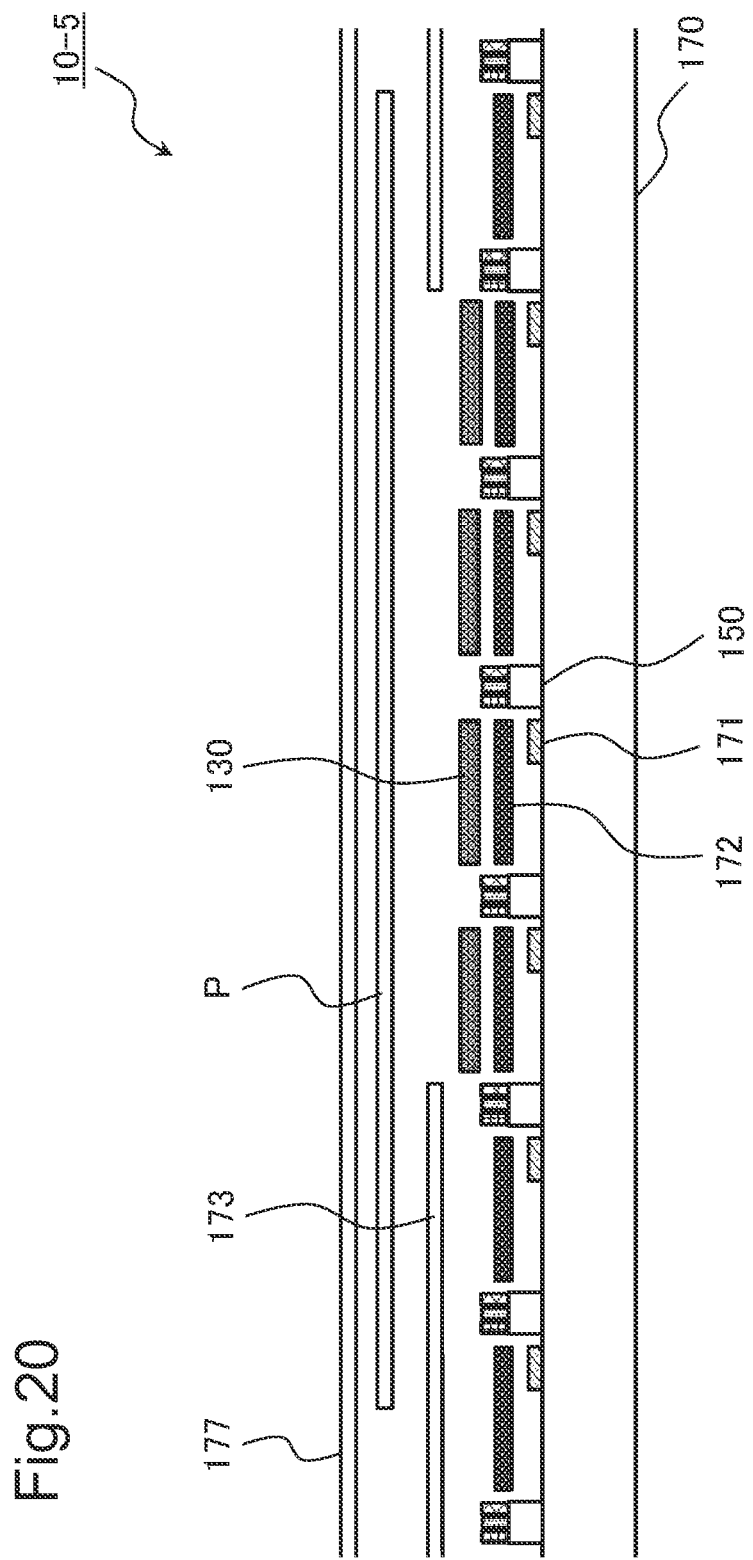
FIG. 20 is a cross-sectional view illustrating an example of an internal configuration of a display antenna according to the present disclosure.

FIG. 20 is a cross-sectional view illustrating an example of a cross section taken along line B-B in FIG. 19. In the cross-sectional view of FIG. 20, there are some places from which hatching is omitted. The power feeding electrode pattern FP2 is formed by wiring of the phase shifter 13 formed in the phase shifter forming layer 130. The ground electrode 173 is disposed so as to avoid a region above the power feeding electrode pattern FP2. The upper surface of the power feeding electrode pattern FP2 faces the lower surface of the patch antenna P via the opening portion (slot). The patch antenna P is electromagnetically coupled to the power feeding electrode pattern FP2 formed in the phase shifter forming layer 130 via the slot between the ground electrodes 173. The patch antenna P is excited by electromagnetically coupling the patch antenna P and the power feeding electrode pattern FP2 via the slot.

According to the present modification, the patch antenna P and the phase shifter 13 can be coupled by electromagnetic coupling. In the configuration of the present modification, the patch antenna P and the phase shifter 13 may not be physically connected. Therefore, in the present modification, since the power feeding electrode FE connecting the patch antenna P and the phase shifter 13 can be omitted, the viewing angle of the light emitter 150 is wider than that in the fourth modification.

As described above, the display antenna of the present example embodiment includes the antenna array, the phase shifter, the display, and the control unit. The display includes a plurality of light emitters arranged in a grid. The antenna array includes an antenna assembly in which a plurality of patch antennas through which light in a wavelength band of a visible region is transmitted is arranged in a grid. The antenna array is disposed on the display in an overlapping manner. The phase shifter is disposed in a gap region sandwiched between the plurality of light emitters. The phase shifter is connected to at least one of the plurality of patch antennas. The phase shifter shifts a signal to be transmitted and received. The control unit controls opening and closing of the switch. The control unit closes the first switch disposed between the plurality of patch antennas to form an antenna assembly. The control unit closes the first switch connected to the patch antenna at the position of the vertex of the antenna assembly that is caused to function as a touch sensor to form the touch panel in which the plurality of antenna assemblies that function as touch sensors are arranged in the row direction and the column direction. The control unit detects a contact position of an indicator on the touch panel according to a capacitance change at an intersection of a row formed by the plurality of antenna assemblies arrayed in the row direction and a column formed by the plurality of antenna assemblies arrayed in the column direction.

In the display antenna of the present example embodiment, a phase shifter is disposed in a gap region sandwiched between a plurality of light emitters. Therefore, according to the display antenna of the present example embodiment, the phase of the signal to be transmitted and received can be shifted by the phase shifter. In the display antenna of the present example embodiment, a touch panel in which a plurality of antenna assemblies functioning as touch sensors are arranged in the row direction and the column direction is formed. Therefore, according to the present example embodiment, it is possible to achieve a display antenna in which the function of the antenna assembly antenna and the function of the touch panel coexist. That is, according to the present example embodiment, a display antenna having a touch panel function and transmitting and receiving radio waves having directivity can be achieved.

In the present example embodiment, a display with an antenna (display antenna) is achieved by combining a transparent patch antenna and a micro LED. In a normal structure, it has been necessary to dispose power feeding electrodes (vias) through gaps between adjacent micro LEDs in order to feed the patch antennas. Such a structure requires fine processing of vias and through-holes of the vias, and is difficult to manufacture. In the structure of the display antenna of the present example embodiment, a phase shifter can be disposed in a gap between adjacent micro LEDs. Therefore, since the display antenna of the present example embodiment does not need to form the via in the gap between the adjacent micro LEDs, it is easy to manufacture as compared with the case where the via is necessary.

In one aspect of the present example embodiment, the light emitter is a micro LED (Light-Emitting Diode). The phase shifter includes at least one transmission line disposed above a gap region sandwiched between adjacent light emitters (micro LEDs). The phase shifter is electrically connected to at least one of the plurality of patch antennas via the power feeding electrode. In the present aspect, since the micro LED is used as the light emitter, the area occupied by the light emitter in the entire display can be reduced. According to the present aspect, the upper side of the gap region generated by using the micro LED as the light emitter can be effectively utilized as the phase shifter forming layer. In the display antenna of the present aspect, since the phase shifter is formed above the gap region, there is no need to microprocess the vias or through-holes of the vias, and the display antenna can be easily manufactured.

In one aspect of the present example embodiment, the transmission line includes a main line connecting an input terminal and a power feeding electrode, and at least one branch line connected to the main line via a phase shift switch. According to the present aspect, a desired phase shift amount can be set by selecting a branch line.

In one aspect of the present example embodiment, the transmission line includes a main line connecting an input terminal and a power feeding electrode, and at least one open stub connected to the main line via a phase shift switch. According to the present aspect, a desired phase shift amount can be set by selecting the open stub.

In one aspect of the present example embodiment, the transmission line includes a 90 degree hybrid circuit connected to an input terminal and a power feeding electrode, and at least one open stub connected to the 90 degree hybrid circuit via a phase shift switch. According to the present aspect, a desired phase shift amount can be set by selecting the open stub.

In one aspect of the present example embodiment, the control unit causes the display to display a user interface associated with a position on the touch panel. The control unit determines the selected input image by associating the detected contact position of the indicator such as a finger with the input image displayed at the contact position on the display. According to the present aspect, it is possible to achieve a user interface that receives a user's operation in accordance with selection of an input image displayed on the display.

Second Example Embodiment

Next, a display antenna according to a second example embodiment will be described with reference to the drawings. The display antenna of the present example embodiment is different from the display antenna according to the first example embodiment in the principle of detecting contact. The display antenna of the present example embodiment optically detects contact.

Configuration

Figure 21:
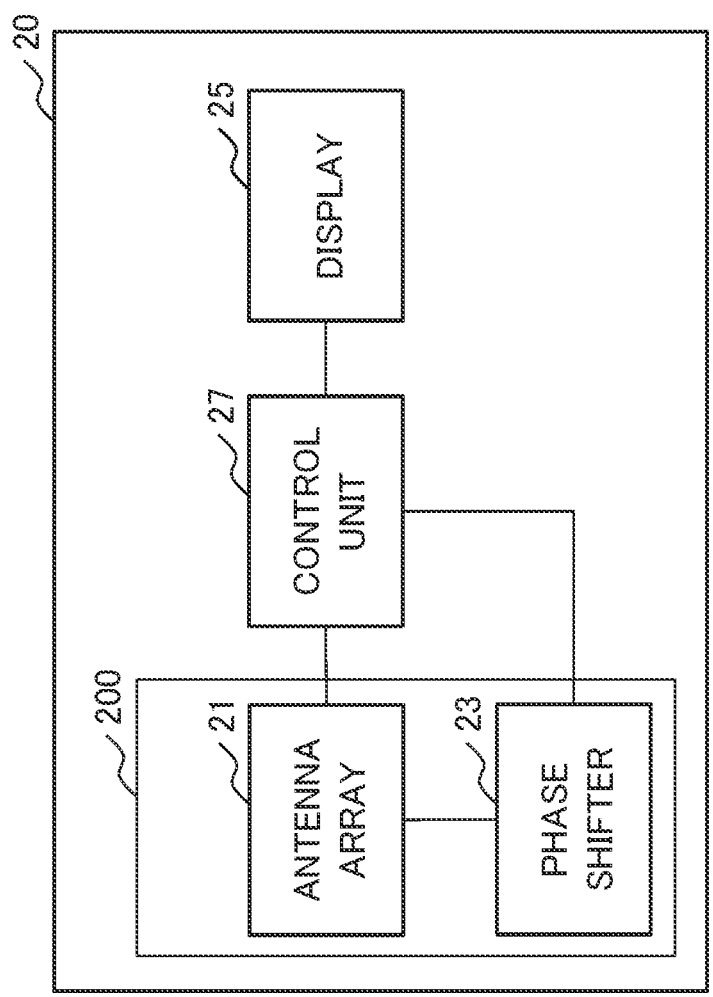
FIG. 21 is a block diagram illustrating an example of a configuration of a display antenna according to the present disclosure.

FIG. 21 is a block diagram illustrating an example of a configuration of a display antenna 20 according to the present example embodiment. The display antenna 20 includes an antenna array 21, a phase shifter 23, a display 25, and a control unit 27. The antenna array 21 and the phase shifter 23 constitute an antenna device 200. The control unit 27 may be added to the antenna device 200. The display antenna 20 has a structure in which the antenna device 200 is superimposed on the display 25. The control unit 27 may be disposed outside the display antenna 20. In this case, the display antenna 20 includes an antenna array 21, a phase shifter 23, and a display 25.

The antenna array 21 has a configuration similar to that of the antenna array 11 of the first example embodiment. The antenna array 21 includes a plurality of patch antennas. The patch antenna is a transparent electrode capable of transmitting light in wavelength bands of the visible region and the near-infrared region. For example, the visible region is a wavelength band of 380 to 800 nm. For example, the near-infrared region is a wavelength band of 0.7 to 2.5 μm (micrometer). The antenna array 21 may be transparent to a wavelength band of light used for detecting contact.

Figure 22:
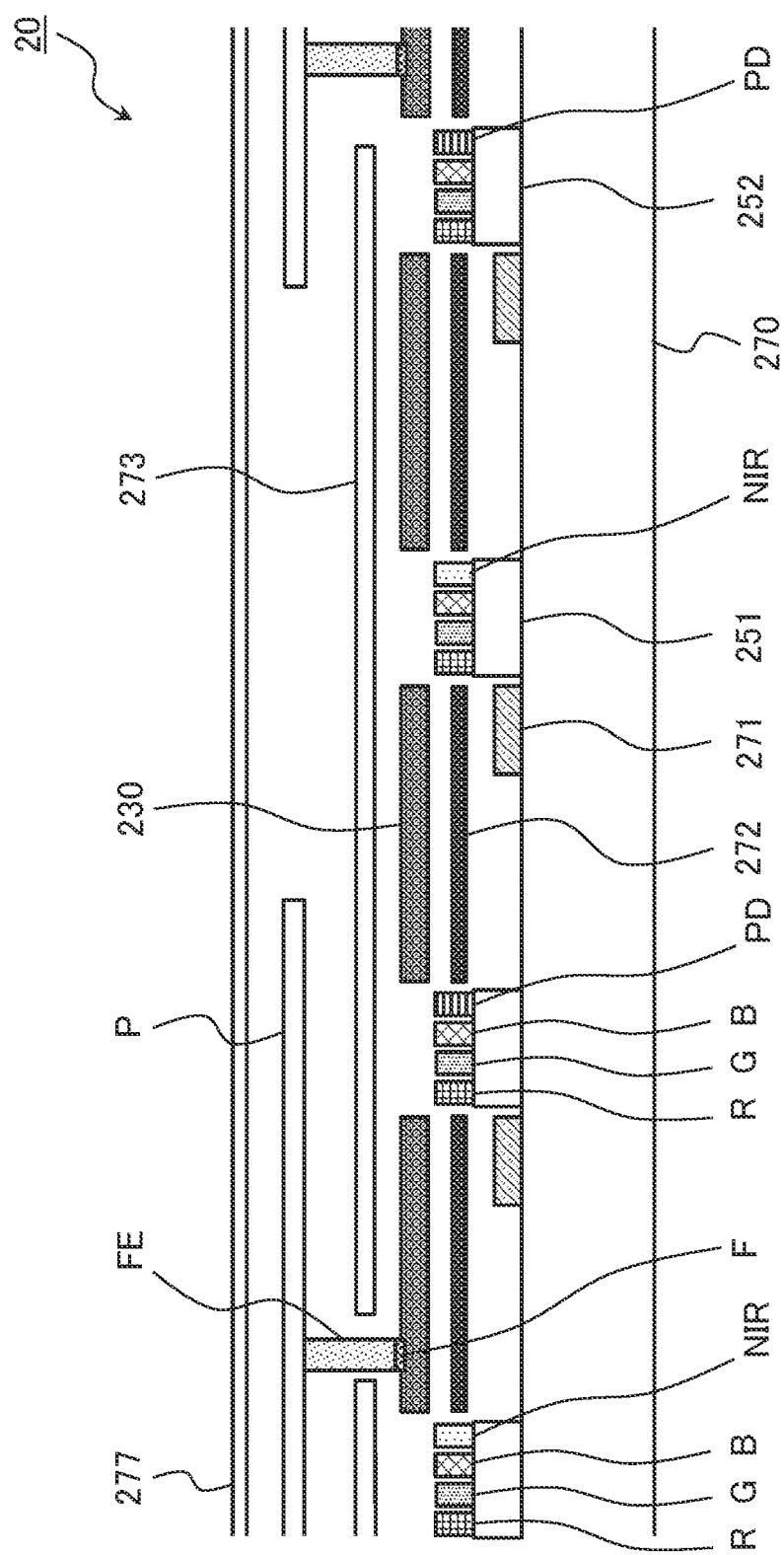
FIG. 22 is a cross-sectional view illustrating an example of an internal configuration of a display antenna according to the present disclosure.

FIG. 22 is a cross-sectional view for explaining an example of the structure of the display antenna 20. In FIG. 22, a part of the configuration of the display antenna 20 is omitted. In the cross-sectional view of FIG. 22, there are some places from which hatching is omitted.

Figure 23:
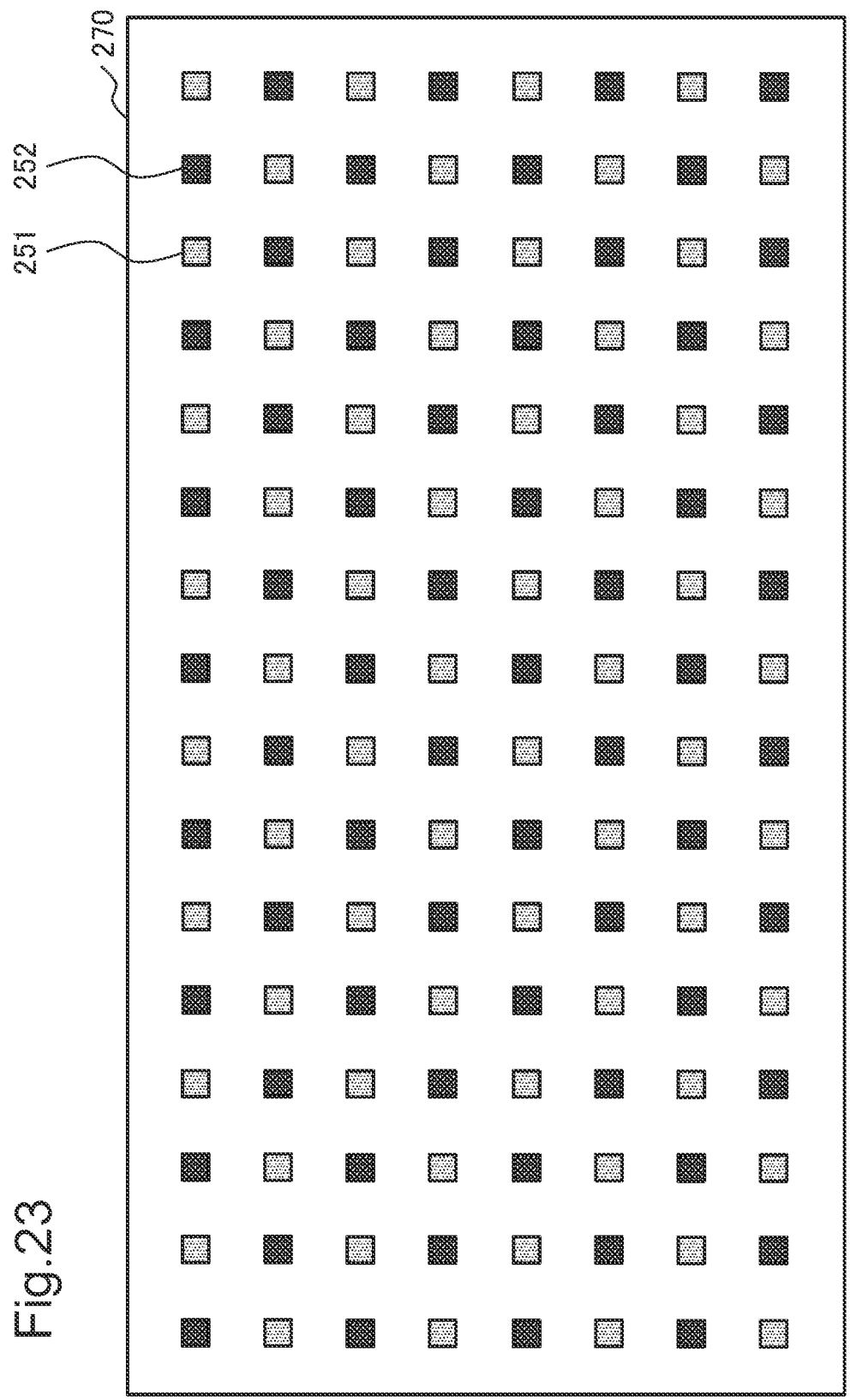
FIG. 23 is a cross-sectional view illustrating an arrangement example of light emitters forming a display of a display antenna according to the present disclosure.

A display 25 is formed on a substrate 270. The display 25 includes a plurality of first light emitters 251 and a plurality of second light emitters 252. The plurality of first light emitters 251 and the plurality of second light emitters 252 are disposed in a two-dimensional array. FIG. 23 is a conceptual diagram illustrating an arrangement example of the plurality of first light emitters 251 and the plurality of second light emitters 252. FIG. 23 is a plan view of the light emitting surfaces of the plurality of first light emitters 251 and the plurality of second light emitters 252 disposed above the substrate 270 as viewed from an upper viewing seat. The plurality of first light emitters 251 and the plurality of second light emitters 252 are alternately disposed.

The first light emitter 251 has a light emitting unit that emits light in a wavelength band relevant to each color of red (R), green (G), and blue (B). The first light emitter 251 includes a light emitting unit that emits near-infrared (NIR) light. The near-infrared NIR light is used to detect a contact position. For example, the first light emitter 251 is achieved by a micro LED (Light-Emitting Diode). For example, the first light emitter 251 is achieved by a micro LED including a red LED that emits light in a red R wavelength band, a green LED that emits light in a green G wavelength band, a blue LED that emits light in a blue B wavelength band, and a near-infrared LED that emits light in a near-infrared NIR wavelength band. The first light emitter 251 may include a light emitting unit that emits light of at least one wavelength band of red R, green G, and blue B and light of a wavelength band of near-infrared NIR. The first light emitter 251 may have a light emitting unit that emits light of a wavelength band different from that of red R, green G, blue B, and near-infrared NIR.

The first light emitter 251 is connected to a drive unit (not illustrated) via wiring included in a wiring layer 271. The first light emitter 251 emits light in the wavelength bands of red R, green G, blue B, and near-infrared NIR according to the control of the drive unit by the control unit 27.

The second light emitter 252 includes a light emitting unit that emits light in a wavelength band relevant to each color of red R, green G, and blue B. The second light emitter 252 includes a photodiode PD sensitive to light in a near-infrared NIR wavelength band. For example, the second light emitter 252 is achieved by an element in which a photodiode PD is added to a micro LED. The photodiode PD is used for detecting contact of an indicator such as a finger. For example, the second light emitter 252 is achieved by an element including a red LED that emits light in a red R wavelength band, a green LED that emits light in a green G wavelength band, a blue LED that emits light in a blue B wavelength band, and a photodiode PD that receives light in a near-infrared NIR wavelength band. The second light emitter 252 may include a light emitting unit that emits light in at least one wavelength band of red R, green G, and blue B. The second light emitter 252 may include a light emitting unit that emits light of a wavelength band different from those of red R, green G, and blue B.

The second light emitter 252 is connected to a drive unit (not illustrated) via wiring included in the wiring layer 271. The second light emitter 252 emits light in the red R, green G, and blue B wavelength bands under the control of the drive unit by the control unit 27. The photodiode PD of the second light emitter 252 receives light in the near-infrared NIR wavelength band. The photodiode PD converts the received light in the near-infrared NIR wavelength band into an electric signal. The photodiode PD outputs the converted electric signal to the control unit 27.

Figure 24:
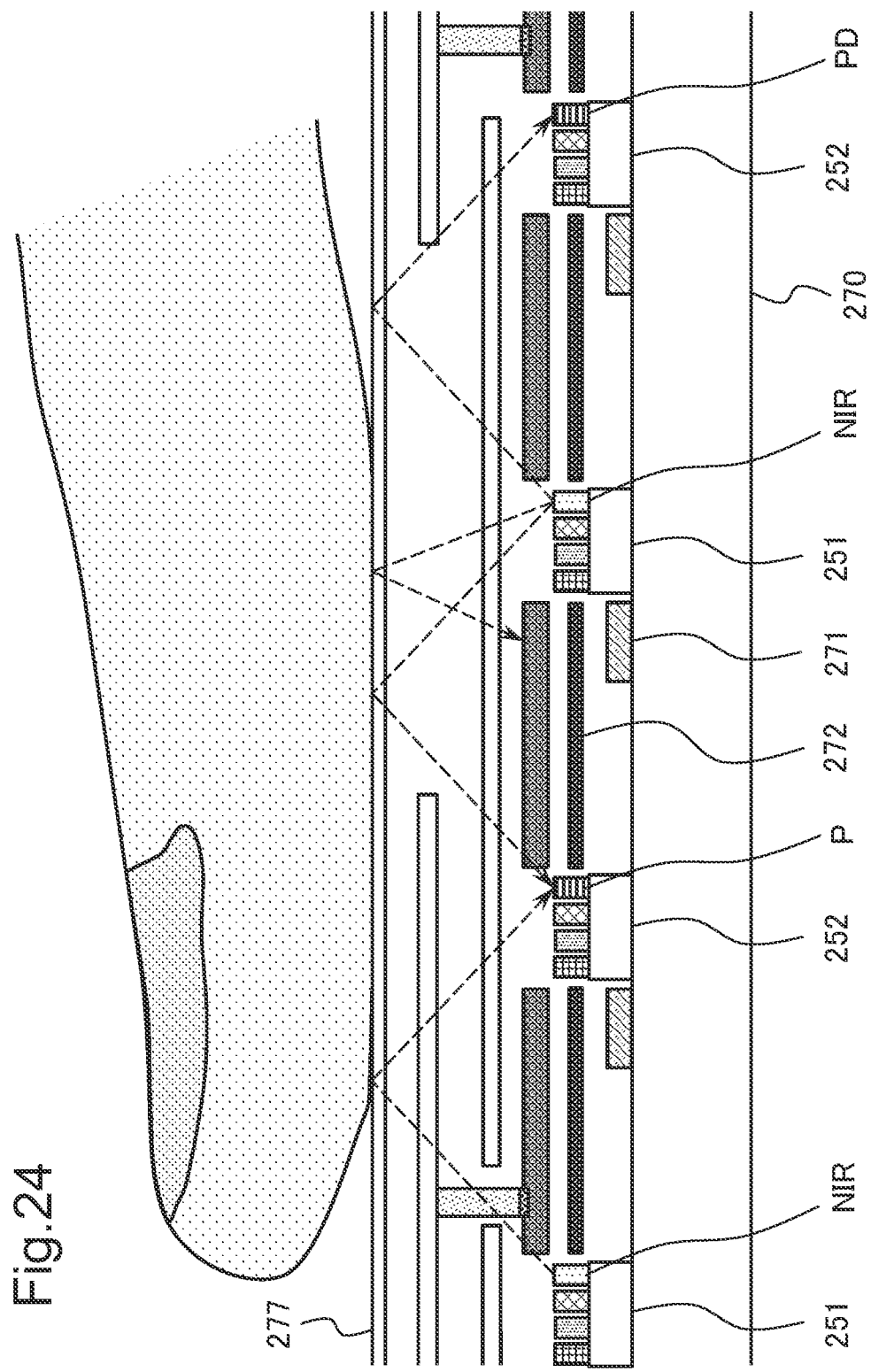
FIG. 24 is a conceptual diagram for explaining detection of a contact position of an indicator by a display antenna according to the present disclosure.

FIG. 24 is a conceptual diagram illustrating an example of contact detection by the display antenna 20. When a finger comes into contact with a part of a protective layer 277, the light emitted from the first light emitter 251 is reflected toward the lower side of the finger. The near-infrared NIR light included in the light emitted from the first light emitter 251 is received by the photodiode PD of the first light emitter 251. The control unit 27 specifies the contact portion according to the position of the second light emitter 252 including the photodiode PD that has received the near-infrared NIR light.

An image of the touch panel including at least one input image is displayed on the display 25. For example, the input image is a button for accepting an operation. For example, the input image is an image of a key that accepts input of characters, numbers, and symbols such as a keyboard and a numeric keypad. For example, the input image is an image that receives an operation, such as a slider or a tag. When contact is detected by the patch antenna P functioning as the touch sensor at the position of the input image displayed on the display 25, an input relevant to the operation detected at the position of the input image is made.

The wiring layer 271 is similar to the wiring layer 171 of the first example embodiment. The wiring layer 271 is formed in a region between the first light emitter 251 and the second light emitter 252. In the wiring layer 271, wiring connected to the plurality of first light emitters 251 and second light emitters 252 forming the display 25 is disposed. In the wiring layer 271, wiring for driving the display 25 is disposed. In the wiring layer 271, wiring for emitting near-infrared NIR light and wiring through which an electric signal relevant to the received near-infrared NIR light is transmitted are disposed. In the wiring layer 271, a first switch, various wirings, and the like may be disposed. A signal line that propagates a signal to be transmitted and received may be disposed in the wiring layer 271. The wiring layer 271 may be a single layer or may have a structure in which a plurality of layers are laminated. For example, by using a device transfer technique, a minute element can be formed in the wiring layer 271. The drawings are omitted for details such as components in the wiring layer 271 and a connection relationship between the components.

A flattening film or a protective film is formed on the display 25 including the plurality of first light emitters 251 and the plurality of second light emitters 252. The flattening film and the protective film are transparent materials through which light in a wavelength band of a visible region can pass. The materials of the flattening film and the protective film are not limited as long as light in the wavelength band of the visible region can be transmitted. For example, the flattening film and the protective film are achieved by silicon oxide or the like. A gap may be formed in the upper portion of the display 25.

A shield electrode 272 is disposed above the region where the wiring layer 271 is formed. The shield electrode 272 has the same configuration as the shield electrode 172 of the first example embodiment. The shield electrode 272 is disposed so as to avoid a region above the light emitter 250. The shield electrode 272 is formed to prevent electromagnetic coupling above and below the shield electrode 272.

A phase shifter forming layer 230 is disposed above the shield electrode 272. The phase shifter 23 is formed in the phase shifter forming layer 230. The phase shifter 23 has the same configuration as the phase shifter 13 of the first example embodiment. The phase shifter 23 is disposed at a position avoiding above the first light emitter 251 and the second light emitter 252. The power feeding point F of the phase shifter 23 is connected to the patch antenna P via the power feeding electrode FE.

The signal having passed through the phase shifter 23 is phase-shifted by a phase shift amount relevant to the electrical length of the passed line or stub according to the opening/closing state of the SW. The phase shift amount of the phase shifter 23 is switched according to the opening/closing control of the phase shift switch SWP by the control unit 27.

A ground electrode 273 is disposed in the shield layer above the display 25 and the phase shifter forming layer 230 configured by the plurality of first light emitters 251 and the second light emitters 252. The ground electrode 273 has the same configuration as the ground electrode 173 of the first example embodiment. The ground electrode 273 is formed to prevent electromagnetic coupling above and below the ground electrode 273. The ground electrode 273 is made of a transparent conductor.

A plurality of patch antennas P are disposed above the shield layer on which the ground electrode 273 is formed. The plurality of patch antennas P are electrically connected to the power feeding point F of the phase shifter 23 formed in the phase shifter forming layer 230 via the power feeding electrode FE. The power feeding electrode FE is a conductive via that electrically connects the patch antenna P and the power feeding point of the phase shifter 23. The material of the power feeding electrode FE is not particularly limited as long as it has conductivity.

The protective layer 277 is formed above the plurality of patch antennas P. The protective layer 277 is formed of a member capable of transmitting light in the wavelength bands of the visible region and the near-infrared region. The material of the protective layer 277 is not limited as long as light of the visible region and the near-infrared region can be transmitted. For example, the protective layer 277 is achieved by a transparent member such as glass or plastic.

A dielectric layer (not illustrated) is formed in a space between the wiring layer 271 and the protective layer 277. The dielectric layer is formed of a dielectric capable of transmitting light in a wavelength band of a visible region. The space between the wiring layer 271 and the protective layer 277 may be filled with a dielectric forming the dielectric layer, or a gap may be formed. The material, shape, and position of the dielectric layer are not particularly limited.

A signal to be transmitted is output from a transmission circuit (not illustrated). The signal output from the transmission circuit reaches the phase shifter 23 through a signal line (not illustrated). The transmission signal that has reached the phase shifter 23 is phase-shifted by the phase shift amount set in phase shifter 23. The signal having passed through the phase shifter 23 reaches the patch antenna P via the power feeding electrode FE. The signal having reached the patch antenna P is transmitted as a radio wave in a wavelength band to be transmitted. The transmission direction of the radio wave transmitted from the display antenna 20 is controlled for each antenna assembly AE.

The reception-target radio wave received by the patch antenna P is phase-shifted by the phase shift amount set in the phase shifter 23 connected to the patch antenna P. The phase-shifted signal is received by a reception circuit (not illustrated) through a signal line. Information included in the signal received by the reception circuit is decoded by a decoder (not illustrated).

The control unit 27 (control means) controls the antenna array 21 to form the antenna assembly AE. The control unit 27 sets the size of the antenna assembly AE in accordance with the frequency band of the radio wave to be transmitted and received. The control unit 27 switches on/off of a first switch (not illustrated) disposed between the patch antennas P to change the combination of the patch antennas P for forming the antenna assembly AE. As a result, the size of the antenna assembly AE is set in accordance with the frequency band of the radio wave to be transmitted and received.

The control unit 27 also sets a phase shift amount of the phase shifter 23. The control unit 27 switches on/off of the phase shift switch SWP disposed in the phase shifter 23 to set the phase shift amount of the phase shifter 23. The control unit 27 supplies a signal to be transmitted to a signal line connected to the input terminal I of the phase shifter 23 for which the phase shift amount is set. The control unit 27 connects at least one of the patch antennas P forming the antenna assembly AE used for transmission of radio waves to a signal source (not illustrated). For example, the control unit 27 closes a switch disposed between the patch antenna P and the signal source, and connects the patch antenna P and the signal source. The signal source is a radio-frequency power source used for transmission of a radio wave to be transmitted. The signal source supplies radio-frequency power relevant to the frequency band of the radio wave to be transmitted and the transmission strength of the radio wave. The antenna assembly AE including the patch antenna P connected to the signal source is supplied with radio-frequency power from a signal source SG. As a result, the transmission target signal supplied from the signal line is phase-shifted according to the phase shift amount of the phase shifter 23 and transmitted from the antenna assembly AE.

The control unit 27 controls display on the display 25. The control unit 27 causes the plurality of first light emitters 251 and the plurality of second light emitters 252 forming the display 25 to emit light such that a user interface for accepting an operation input is displayed. The control unit 27 causes the plurality of first light emitters 251 and the plurality of second light emitters 252 to emit light such that display information for performing selection and operation at the detection position is displayed in association with the detection position of the touch panel set in the antenna array 21. In a case where the user interface is not displayed, the control unit 27 may cause the plurality of first light emitters 251 and the plurality of second light emitters 252 forming the display 25 to emit light such that an image unrelated to the touch panel is displayed. A display control unit (not illustrated) other than the control unit 27 may be used for display control of the display 25.

The control unit 27 causes the near-infrared NIR light emitting units included in the plurality of first light emitters 251 to emit light. The timing at which the near-infrared NIR light emitting unit emits light is set to any value. For example, the control unit 27 causes the near-infrared NIR light emitting unit to emit light during a period in which the user interface is displayed on the display 25. The control unit 27 acquires an electric signal relevant to light received by the photodiodes PD included in the plurality of second light emitters 252. The control unit 27 specifies the position of the second light emitter 252 including the photodiode PD that has output the electric signal as the contact portion. The control unit 27 receives an input relevant to the display information displayed at the specified position.

As described above, the display antenna 20 can simultaneously exert the function of the touch panel and the function of the phased array antenna. The display antenna 20 may be used as a touch panel without using a function of a phased array. The display antenna 20 may be used as a phased array antenna without using a function of a touch panel.

As described above, the display antenna of the present example embodiment includes the antenna array, the phase shifter, the display, and the control unit. The display includes a plurality of light emitters arranged in a grid. The light emitter includes a first light emitter including a light emitting unit that emits light in a near-infrared region, and a second light emitter including a photodiode sensitive to the light in the near-infrared region. The display includes a touch panel in which the first light emitters and the second light emitters are alternately arranged. The antenna array includes an antenna assembly in which a plurality of patch antennas through which light in a wavelength band of a visible region and a near-infrared region is transmitted is arranged in a grid. The antenna array is disposed on the display in an overlapping manner. The phase shifter is disposed in a gap region sandwiched between the plurality of light emitters. The phase shifter is connected to at least one of the plurality of patch antennas. The phase shifter shifts a signal to be transmitted and received. The control unit controls opening and closing of the switch. The control unit closes the first switch disposed between the plurality of patch antennas to form an antenna assembly. The control unit causes the display to display a user interface associated with a position on the touch panel. The control unit detects the contact position of the indicator in accordance with reception of light in the near-infrared region by the photodiode included in the second light emitter. The control unit determines the selected input image by associating the detected contact position of the indicator with the input image displayed at the contact position.

In the display antenna of the present example embodiment, a phase shifter is disposed in a gap region sandwiched between a plurality of light emitters. Therefore, according to the display antenna of the present example embodiment, the phase of the signal to be transmitted and received can be shifted by the phase shifter. In the display antenna of the present example embodiment, a touch panel is formed by a configuration in which reflected light of light in a near-infrared region emitted from the light emitting unit of the first light emitter is received by a photodiode of the second light emitter. Therefore, according to the present example embodiment, it is possible to achieve a display antenna in which the function of the phased array antenna and the function of the touch panel coexist. That is, according to the present example embodiment, a display antenna having a touch panel function and transmitting and receiving radio waves having directivity can be achieved.

In one aspect of the present example embodiment, the control unit causes the display to display a user interface associated with a position on the touch panel. The control unit detects the contact position of the indicator touch panel in accordance with reception of light in the near-infrared region by the photodiode included in the second light emitter. The control unit determines the selected input image by associating the detected contact position of the indicator with the input image displayed at the contact position on the display. According to the present aspect, it is possible to achieve a user interface that receives a user's operation in accordance with selection of an input image displayed on the display.

Third Example Embodiment

Next, a display antenna according to a third example embodiment will be described with reference to the drawings. The display antenna of the present example embodiment has a simplified configuration of the display antennas according to the first and second example embodiments.

Figure 25:
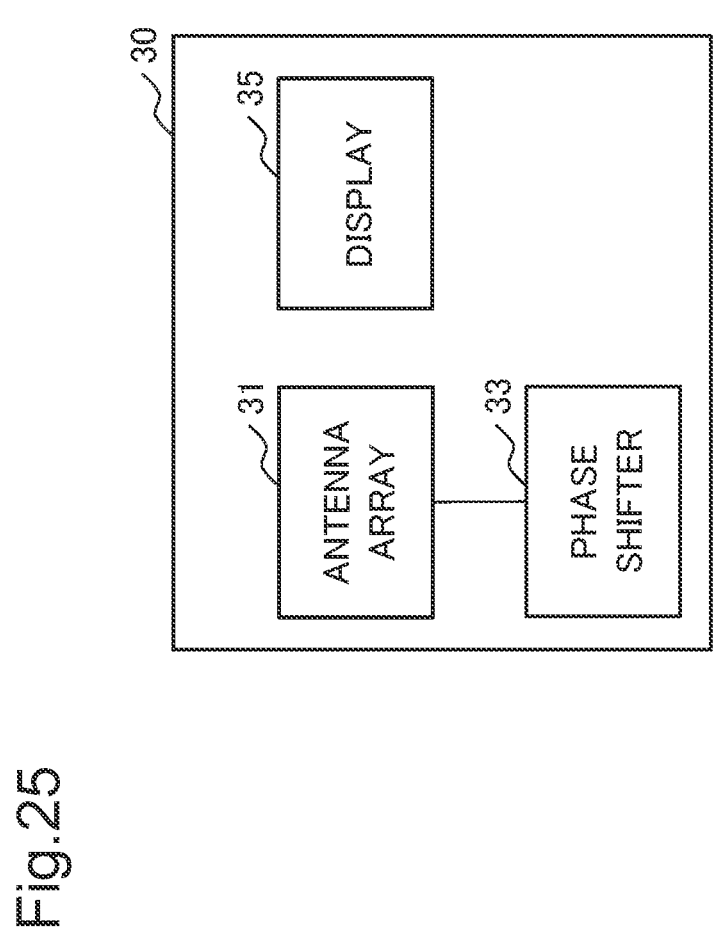
FIG. 25 is a block diagram illustrating an example of a configuration of a display antenna according to the present disclosure.

FIG. 25 is a block diagram illustrating an example of a configuration of a display antenna 30 according to the present example embodiment. The display antenna 30 includes an antenna array 31, a phase shifter 33, and a display 35.

The display 35 includes a plurality of light emitters arranged in a grid. The antenna array 31 includes an antenna assembly in which a plurality of patch antennas through which light in a wavelength band of a visible region is transmitted is arranged in a grid. The antenna array 31 is disposed on the display 35 in an overlapping manner. The phase shifter 33 is disposed in a gap region sandwiched between the plurality of light emitters. The phase shifter 33 is connected to at least one of the plurality of patch antennas. The phase shifter 33 shifts a signal to be transmitted and received.

As described above, in the display antenna of the present example embodiment, a phase shifter is disposed in a gap region sandwiched between a plurality of light emitters. Therefore, in the display antenna of the present example embodiment, the phase of the signal to be transmitted and received can be shifted by the phase shifter. That is, according to the display antenna of the present example embodiment, it is possible to transmit and receive a radio wave having directivity by shifting the phase of a signal to be received.

(Hardware)

Next, a hardware configuration for executing control and processing according to each example embodiment of the present disclosure will be described with reference to the drawings. Here, an example of such a hardware configuration is an information processing device 90 (computer) in FIG. 26. The information processing device 90 in FIG. 26 is a configuration example for executing the control and processing of each example embodiment, and does not limit the scope of the present disclosure.

Figure 26:
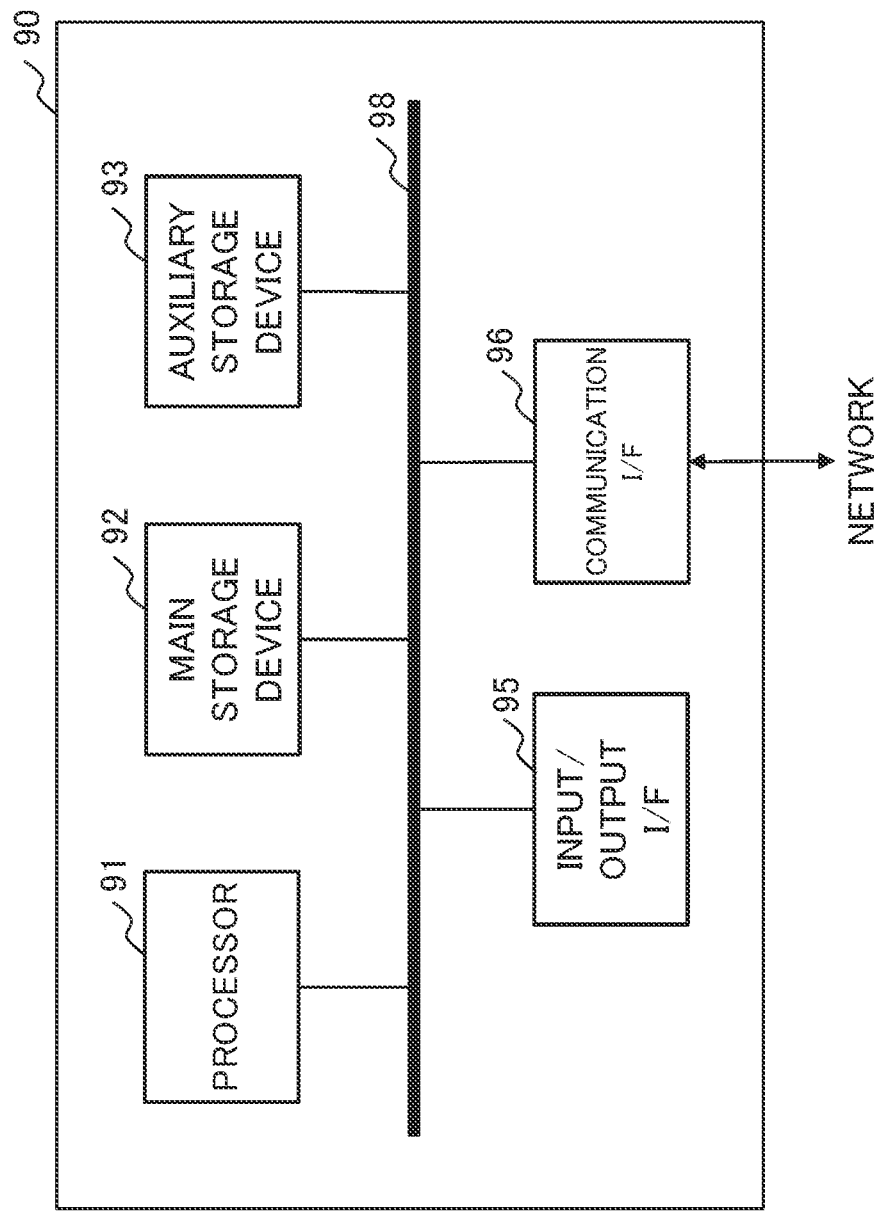
FIG. 26 is a block diagram illustrating an example of a hardware configuration that executes control and processing of each example embodiment.

As illustrated in FIG. 26, the information processing device 90 includes a processor 91, a main storage device 92, an auxiliary storage device 93, an input/output interface 95, and a communication interface 96. In FIG. 26, the interface is abbreviated as an I/F. The processor 91, the main storage device 92, the auxiliary storage device 93, the input/output interface 95, and the communication interface 96 are data-communicably connected to each other via a bus 98. The processor 91, the main storage device 92, the auxiliary storage device 93, and the input/output interface 95 are connected to a network such as the Internet or an intranet via the communication interface 96.

The processor 91 develops a program (instruction) stored in the auxiliary storage device 93 or the like in the main storage device 92. For example, the program is a software program for executing the control and processing of each example embodiment. The processor 91 executes the program developed in the main storage device 92. The processor 91 executes the control and processing according to each example embodiment by executing the program.

The main storage device 92 has an area in which a program is developed. A program stored in the auxiliary storage device 93 or the like is developed in the main storage device 92 by the processor 91. The main storage device 92 is implemented by, for example, a volatile memory such as a dynamic random access memory (DRAM). A nonvolatile memory such as a magneto resistive random access memory (MRAM) may be configured and added as the main storage device 92.

The auxiliary storage device 93 stores various data such as programs. The auxiliary storage device 93 is implemented by a local disk such as a hard disk or a flash memory. Various data may be stored in the main storage device 92, and the auxiliary storage device 93 may be omitted.

The input/output interface 95 is an interface for connecting the information processing device 90 and a peripheral device. The communication interface 96 is an interface for connecting to an external system or device through a network such as the Internet or an intranet based on a standard or a specification. The input/output interface 95 and the communication interface 96 may be shared as an interface connected to an external device.

An input device such as a keyboard, a mouse, or a touch panel may be connected to the information processing device 90 as necessary. These input devices are used to input information and settings. When a touch panel is used as the input device, a screen having a touch panel function serves as an interface. The processor 91 and the input device are connected via the input/output interface 95.

The information processing device 90 may be provided with a display device for displaying information. In a case where a display device is provided, the information processing device 90 may include a display control device (not illustrated) for controlling display of the display device. The display device may be connected to the information processing device 90 via the input/output interface 95.

The information processing device 90 may be provided with a drive device. The drive device mediates reading of data and a program stored in a recording medium and writing of a processing result of the information processing device 90 to the recording medium between the processor 91 and the recording medium (program recording medium). The information processing device 90 and the drive device are connected via an input/output interface 95.

The above is an example of the hardware configuration for enabling the control and processing according to each example embodiment of the present disclosure. The hardware configuration of FIG. 26 is an example of a hardware configuration for executing the control and processing of each example embodiment, and does not limit the scope of the present disclosure. A program for causing a computer to execute the control and processing according to each example embodiment is also included in the scope of the present disclosure.

Further, a program recording medium in which the program according to each example embodiment is recorded is also included in the scope of the present disclosure. The recording medium can be achieved by, for example, an optical recording medium such as a compact disc (CD) or a digital versatile disc (DVD). The recording medium may be implemented by a semiconductor recording medium such as a universal serial bus (USB) memory or a secure digital (SD) card. The recording medium may be implemented by a magnetic recording medium such as a flexible disk, or another recording medium. When a program executed by the processor is recorded in a recording medium, the recording medium is associated to a program recording medium.

The components of each example embodiment may be made in any combination. The components of each example embodiment may be implemented by software. The components of each example embodiment may be implemented by a circuit.

The previous description of embodiments is provided to enable a person skilled in the art to make and use the present invention. Moreover, various modifications to these example embodiments will be readily apparent to those skilled in the art, and the generic principles and specific examples defined herein may be applied to other embodiments without the use of inventive faculty. Therefore, the present invention is not intended to be limited to the example embodiments described herein but is to be accorded the widest scope as defined by the limitations of the claims and equivalents. Further, it is noted that the inventor's intent is to retain all equivalents of the claimed invention even if the claims are amended during prosecution.

The invention claimed is:

1. A display antenna comprising:
   a display including a plurality of light emitters arranged in a grid:
   an antenna array having an antenna assembly in which a plurality of patch antennas through which light in a wavelength band of a visible region is transmitted is disposed in a grid, the antenna array being disposed to be superimposed on the display; and
   a phase shifter disposed in a gap region sandwiched between the adjacent light emitters, connected to at least one of the plurality of patch antennas, and configured to shift a signal to be transmitted and received.

2. The display antenna according to claim 1, wherein
   the light emitter is a micro light-emitting diode (LED), and
   the phase shifter includes at least one transmission line disposed above the gap region sandwiched between the adjacent light emitters, and is electrically connected to at least one of the plurality of patch antennas via a power feeding electrode.

3. The display antenna according to claim 2, wherein
   the transmission line includes a main line connecting an input terminal and the power feeding electrode, and at least one branch line connected to the main line via a phase shift switch.

4. The display antenna according to claim 2, wherein
   the transmission line includes a main line connecting an input terminal and the power feeding electrode, and at least one open stub connected to the main line via a phase shift switch.

5. The display antenna according to claim 2, wherein
   the transmission line includes a 90 degree hybrid circuit connected to an input terminal and the power feeding electrode, and at least one open stub connected to the 90 degree hybrid circuit via a phase shift switch.

6. The display antenna according to claim 1, further comprising
   a controller that includes
   a memory storing instructions, and
   a processor connected to the memory and configured to execute the instructions to
   close a first switch disposed between the plurality of the patch antennas to form the antenna assembly.

7. The display antenna according to claim 6, wherein
   the processor is configured to execute the instructions to
   close the first switch connected to the patch antenna at a position of a vertex of the antenna assembly that is caused to function as a touch sensor to form a touch panel in which a plurality of the antenna assemblies that function as the touch sensor are arranged in a row direction and a column direction, and
   detect a contact position of an indicator on the touch according to a capacitance change at an intersection of a row formed by the plurality of the antenna assemblies arrayed in the row direction and a column formed by the plurality of the antenna assemblies arrayed in the column direction.

8. The display antenna according to claim 7, wherein
   the processor is configured to execute the instructions to cause the display to display a user interface associated with a position on the touch panel, and determine the selected input image by associating the detected contact position of the indicator with an input image displayed at the contact position on the display.

9. The display antenna according to claim 1, wherein the patch antenna transmits light in a visible region and a near-infrared region, the light emitter includes a first light emitter including a light emitting unit that emits light in a near-infrared region, and a second light emitter including a photodiode sensitive to light in a near-infrared region, and the display includes a touch panel in which the first light emitter and the second light emitter are alternately arranged.

10. The display antenna according to claim 9, further comprising a controller that includes a memory storing instructions, and a processor connected to the memory and configured to execute the instructions to cause the display to display a user interface associated with a position on the touch panel, detect a contact position of an indicator according to reception of light in a near-infrared region by the photodiode included in the second light emitter, and determine the selected input image by associating the detected contact position of the indicator with an input image displayed at the contact position.

* * * * *